(12) United States Patent
Wood et al.

(10) Patent No.: US 11,493,753 B1
(45) Date of Patent: Nov. 8, 2022

(54) MULTI-BEAM, WAVELENGTH-TUNED LASER SCANNING

(71) Applicant: Insight Photonic Solutions, Inc., Lafayette, CO (US)

(72) Inventors: Christopher Wood, Lafayette, CO (US); Jason Ensher, Lafayette, CO (US); Russell Sibell, Lafayette, CO (US)

(73) Assignee: INSIGHT LIDAR, INC., Lafayette, CO (US)

( * ) Notice: Subject to any disclaimer, the term of this patent is extended or adjusted under 35 U.S.C. 154(b) by 350 days.

(21) Appl. No.: 16/581,955

(22) Filed: Sep. 25, 2019

Related U.S. Application Data

(60) Provisional application No. 62/808,902, filed on Feb. 22, 2019, provisional application No. 62/788,979, filed on Jan. 7, 2019, provisional application No. 62/736,506, filed on Sep. 26, 2018.

(51) Int. Cl.
| | |
|---|---|
| *G02B 26/10* | (2006.01) |
| *G02B 27/10* | (2006.01) |
| *G02B 26/12* | (2006.01) |
| *G02B 27/28* | (2006.01) |
| *G02F 1/13363* | (2006.01) |

(52) U.S. Cl.
CPC ........... *G02B 26/123* (2013.01); *G02B 27/10* (2013.01); *G02B 27/28* (2013.01); *G02F 1/13363* (2013.01)

(58) Field of Classification Search
CPC .... G02B 26/10; G02B 26/123; G02B 26/108; G02B 27/10; G02B 27/28; G02B 23/04; G02B 23/06; G02B 23/14; G02B 21/00; G02B 21/0008; G02B 21/0028; G02B 21/0064; G01S 7/481; G01S 7/4811; G01S 17/08; G01S 17/32; G01S 17/10; G01S 17/188; G02F 1/13363
USPC ... 359/197.1, 198.1, 201.1, 204.5, 399, 403; 356/3.02, 5.09, 4.1, 309
See application file for complete search history.

(56) References Cited

U.S. PATENT DOCUMENTS

| | | | |
|---|---|---|---|
| 4,424,442 A | 1/1984 | Kitamura | |
| 6,687,036 B2 | 2/2004 | Riza | |
| 9,733,460 B2 * | 8/2017 | Kang | G02B 21/0008 |
| 11,162,789 B2 * | 11/2021 | Lodin | G02B 27/4244 |
| 2004/0004746 A1 | 1/2004 | Riza | |

FOREIGN PATENT DOCUMENTS

WO    WO 2018107237    *  6/2018    ............. G01C 15/00

OTHER PUBLICATIONS

Chan, et al. "2-Dimensional Beamsteering Using Dispersive Deflectors and Wavelength Tuning", Optics Express vol. 16, Issue 19, 2008, 12 Pages.

(Continued)

*Primary Examiner* — Jie Lei

(57) ABSTRACT

An optical system and a method for non-mechanically (i.e., without physical movement) scanning a laser using a lens, a steering optical element, and transmission and receive paths having a non-zero spatial offset. Also, an optical system and a method for non-linearly and non-mechanically scanning a laser using a lens and a steering optical element, such that detection points resulting from the scanned laser are non-linearly mapped into space.

45 Claims, 23 Drawing Sheets

(56) References Cited

OTHER PUBLICATIONS

Oh, et al. "Free-Space Transmission With Passive 2D Beam Steering for Multi-Gigabit-per-Second per-Beam Indoor Optical Wireless Networks", Optics Express vol. 24, Issue 17, 2016, 17 Pages.
Guo, et al. "Two-Dimensional Optical Beam Steering With InP-Based Photonic Integrated Circuits", IEEE Journal of Selected Topics in Quantum Electronics vol. 19, Issue 4, 2013, 12 Pages.
Yaqoob, et al. "High-Speed Two-Dimensional Laser Scanner Based on Bragg Gratings Stored in Photothermorefractive Glass", Applied Optics vol. 42, Issue 26, 2003, Abstract Only.
Tearney, et al. "Spectrally Encoded Confocal Microscopy", Optics Letters, vol. 23, Issue 15, 1998, 3 Pages.
Metz, et al. "Compact, Transmissive Two-Dimensional Spatial Disperser Design With Application in Simultaneous Endoscopic Imaging and Laser Microsurgery" Applied Optics vol. 53, Issue 3, 2014, 8 Pages.
Rodriguez, et al. "Multi-Beam and Single-Chip LIDAR With Discrete Beam Steering by Digital Micromirror Device", Proceedings of SPIE 10526, Physics and Simulation of Optoelectronic Devices XXVI, 105260U, 2018, 8 Pages.
Li, et al. "Laser Coarse-Fine Coupling Scanning Method by Steering Double Prisms", Applied Optics vol. 51, Issue 3, 2012, 9 Pages.
Riza, et al. "Space-Multiplexed Optical Scanner", Applied Optics vol. 43, Issue 13, 2004, 6 Pages.
Yaqoob, et al. "Free-Space Wavelength-Multiplexed Optical Scanner Demonstration", Applied Optics vol. 41, Issue 26, 2002, 6 Pages.
Khan, et al. "Demonstration of 3-Dimensional Wide Angle Laser Beam Scanner Using Liquid Crystals", Optics Express vol. 12, Issue 5, 2004, 15 Pages.
Yaqoob, et al. "Agile Optical Beam Scanners Using Wavelength and Space Manipulations" Proceedings of SPIE 4471, Algorithms and Systems for Optical Information Processing V, 2001, Abstract Only.
Lin, et al. "Design and Simulation of an Optical Beam Deflector Based on Liquid Crystal and Blazed Grating" 2018 Asia Communications and Photonics Conference, 2018, Abstract Only.

* cited by examiner

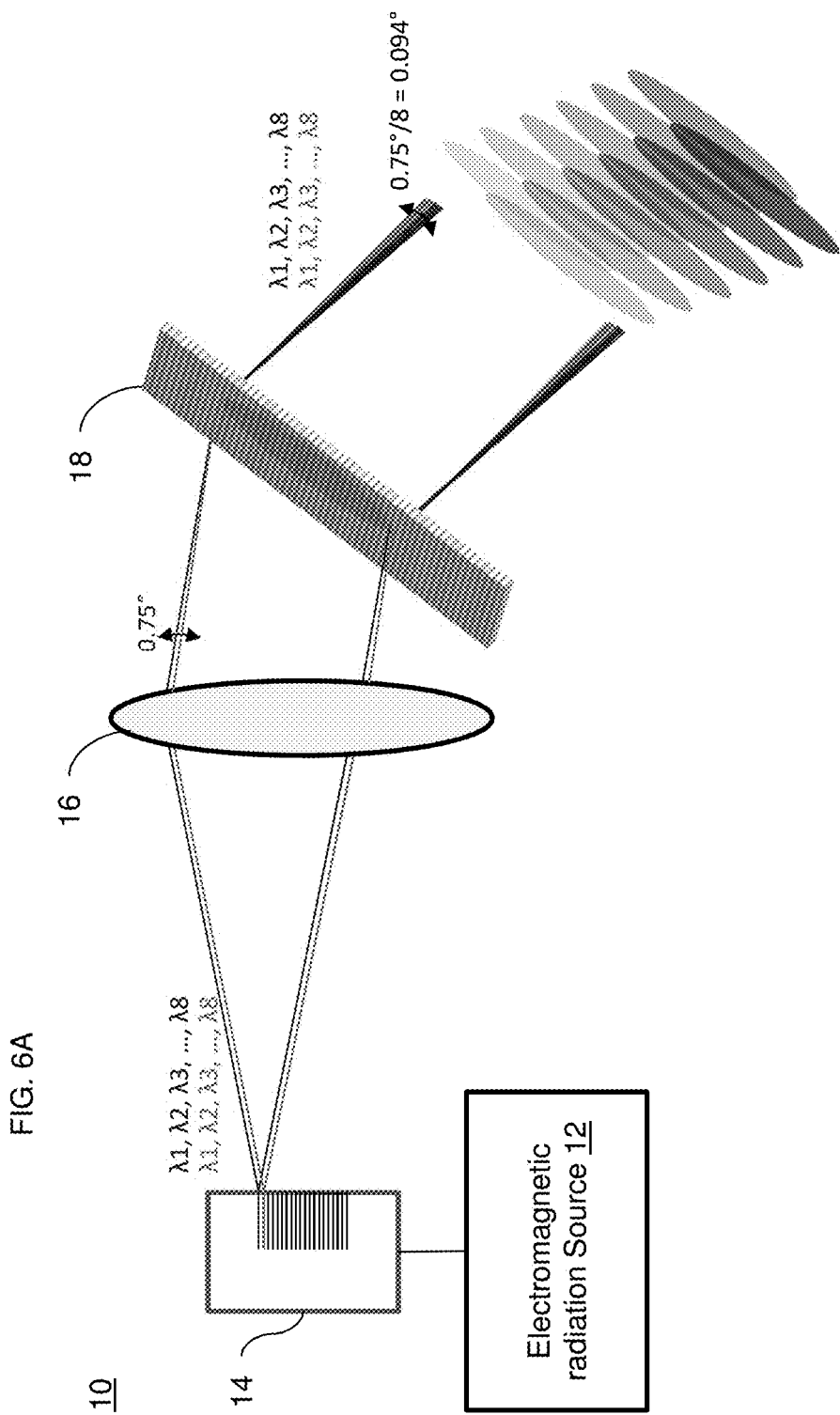

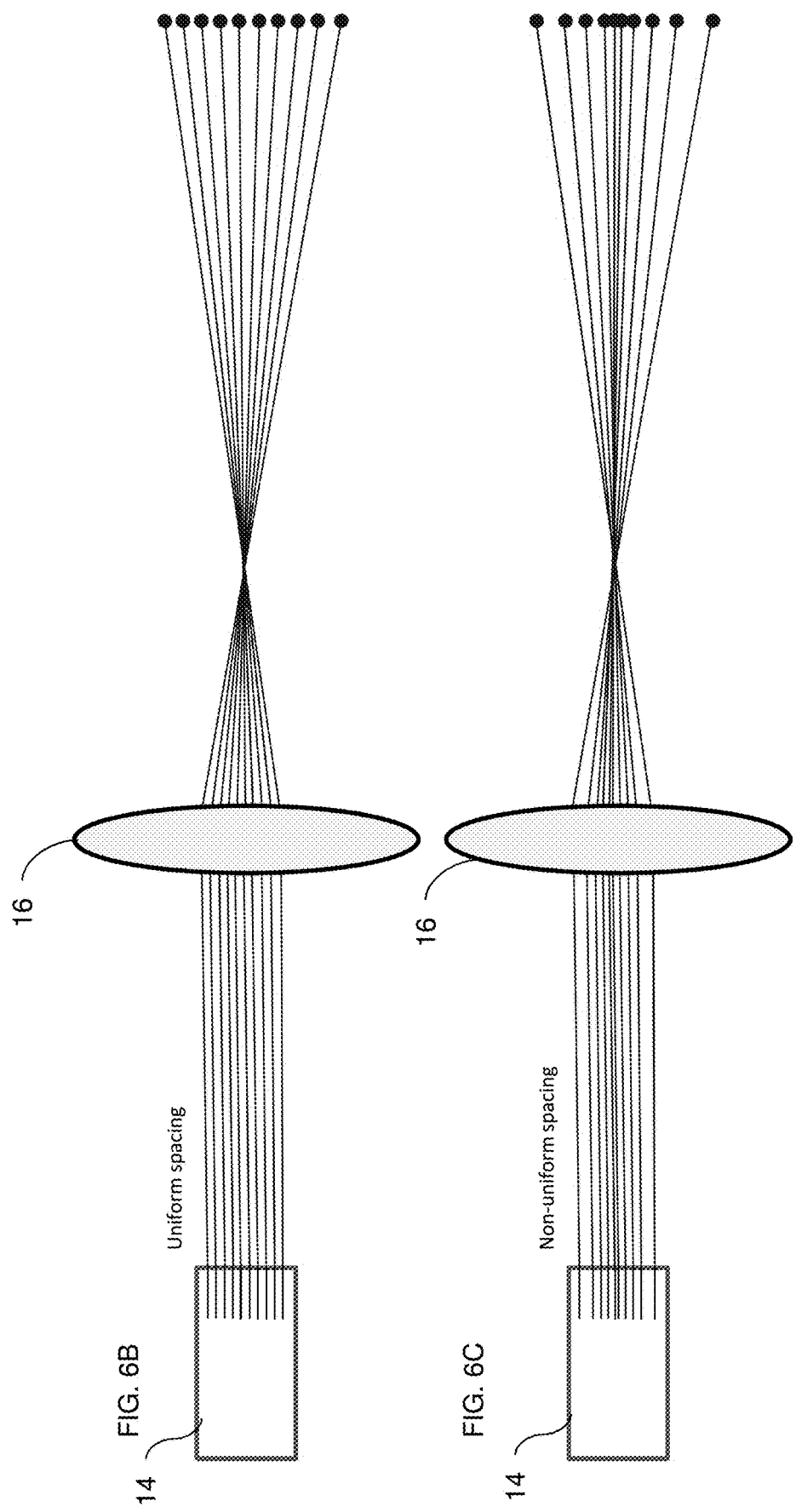

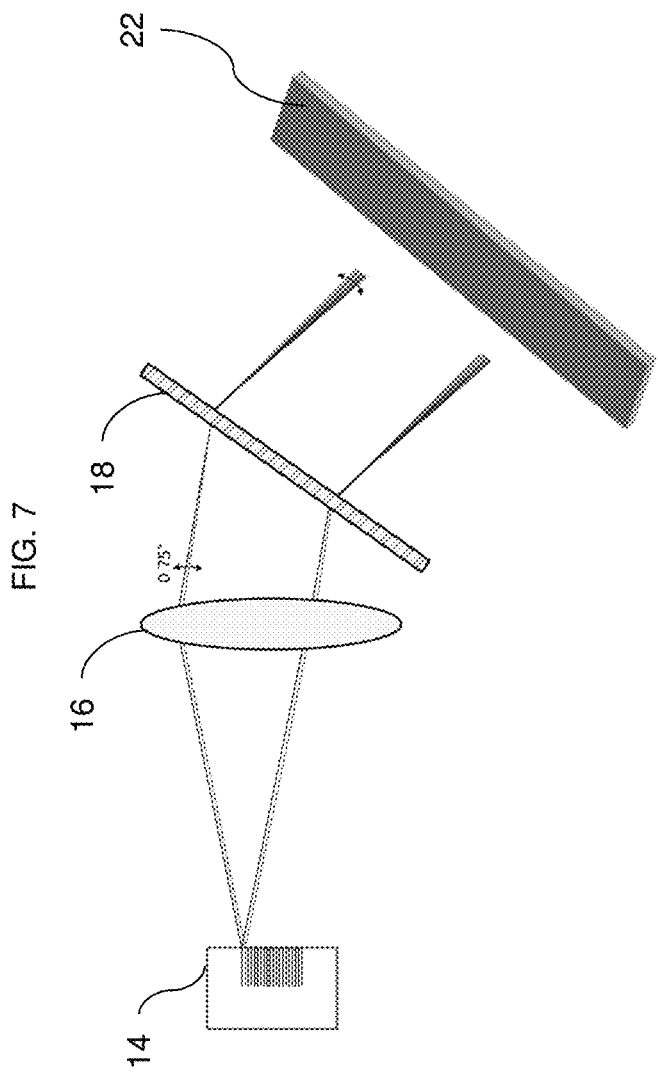

FIG. 11

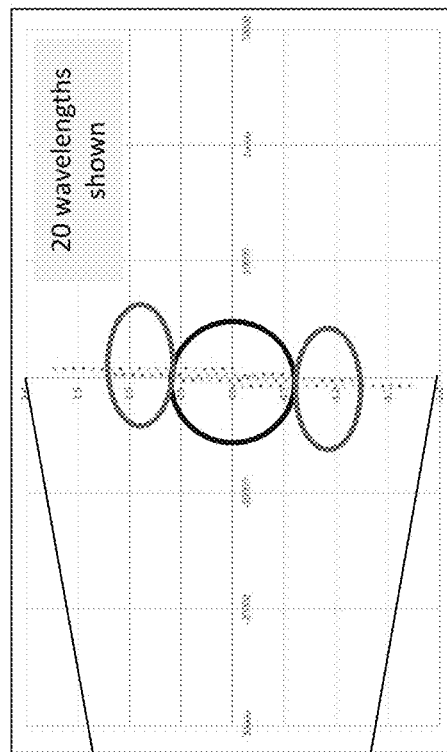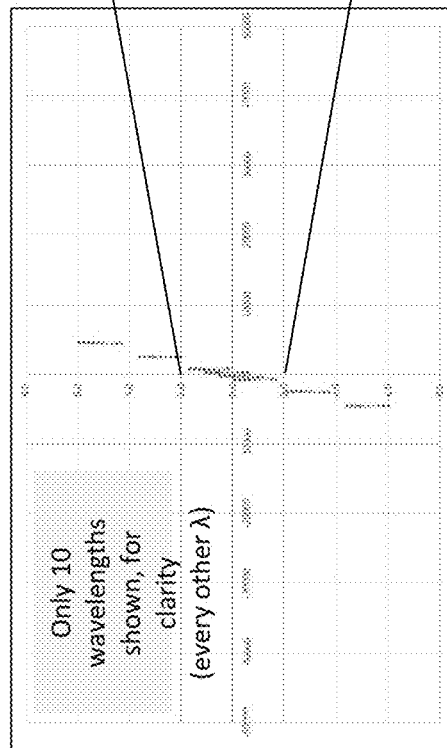
FIG. 19

MULTI-BEAM, WAVELENGTH-TUNED LASER SCANNING

RELATED APPLICATIONS

This application claims the benefit of U.S. Application No. 62/736,506 filed on Sep. 26, 2019. Which is herein incorporated by reference in its entirety.

TECHNICAL FIELD

The present invention relates generally to a system and a method for scanning one or more laser beams through a pattern of spatial positions, using a combination of optical beams and optically dispersive elements. These scanning techniques, when combined with a similar and corresponding detection scheme, can be used for any laser-based approach to imaging ("active imaging") or sensing, such as Light Detection and Ranging (LiDAR), Laser Detection and Ranging (LaDAR), spectroscopy, remote sensing, interferometry, free space laser communications, surveillance, and mapping, among many others.

BACKGROUND

Since the earliest days of laser technology, there has been a need to move a laser beam over a pattern of spatial positions ("laser scanning"), and the various methods in use today are too numerous to detail. However, recent higher speed active imaging applications have highlighted a specific weakness in all these established (typically short-range) techniques, particularly when combined with significant imaging or sensing distances. In that scenario, and because of the finite round trip transit time to an imaged target due to the speed of light, a single scanning laser beam is often not able to meet the imaging speed requirements.

SUMMARY

As an example, if each spot or pixel in an image requires 2 microseconds (µs) for a measurement, and an image of 1250×400 pixels is desired, then this system would take 1 second to create a single image. If the application requires an image rate of 30 images per second (30 Hz rate), then this is 30× too slow. In this example, if the scanning technique was able to appropriately accommodate 30 simultaneous beams, rather than a single scanning beam, then the requirements may still be met. Ideally, such a parallel beam laser scanner would also minimize or eliminate any moving parts or moving mechanisms and could operate at very high spatial speeds.

There is a need for an approach to high-speed laser scanning that incorporates multiple simultaneous laser beams utilizing non-mechanical means for various angular adjustments of the beams. Such a system is capable of solving the above challenge for high speed imaging as well as the requirement for long range imaging (with significant time delay due to the speed of light). For active imaging systems with ranges or distances on the order of 200 meters, the round-trip transit time delay due to the speed of light is 1.3 microseconds. This places a severe burden on the system, as each pixel in the image must now 'wait' for this amount of time before it begins to receive the return (reflected) signal from a target illuminated by the laser beam. A solution to this problem is the use of multiple laser beams, all scanning simultaneously, in order to effectively overcome this time delay problem and reach higher imaging speeds.

The prototypical method of laser scanning is shown in FIG. 1 and FIG. 2, where the motion of the laser beam is created by one or more mirrors with rotating mechanical axes. The angle of the outgoing beam from such an arrangement depends on the rotation angle(s) of the mirror(s) as well as the angle of the incident beam. Those skilled in the art are familiar with this configuration, as well as its numerous embodiments and variations that can be described as having a 'rotating mechanical axis'.

Alternatively, FIG. 3 shows a known method of laser scanning using non-mechanical means. In this case, an optically dispersive element is used in conjunction with a laser whose emission wavelength is tunable. The angle of the outgoing beam from such an arrangement now depends on the laser's wavelength, or on the dispersive property of the element such as the index of refraction. Assuming that changing the laser's wavelength is faster than changing the dispersion of the element (such as through heating), it is desirable to imagine a beam steering mechanism that uses the fast wavelength tuning of the laser. Assuming that wavelength can be changed via non-mechanical means—in either discrete or continuous fashion—then this method of laser scanning can be categorized as 'non-mechanical'. The limiting technical constraint with the configuration of FIG. 3 is a limited amount of angular coverage due to a limited amount of wavelength tuning for the laser, given a typical value of optical dispersion. For instance, only 8 degrees of angular tuning is typically achievable using a typical diffraction grating (dispersion~0.08 deg/nm) and an extremely wide-tuning laser bandwidth of 100 nm. One skilled in the art will recognize that such arguments also apply to an optical phased array, as an example of a programmable dispersive element.

FIG. 4 shows a method for achieving a sort of non-mechanical steering for laser beams using only passive optical elements. Here, a spatial array of emission points is positioned near the focal plane of a lens, and the optical property of this lens converts these spatial offsets before the lens to angular offsets after the lens. The accessible output angles after the lens depend on the spatial positions of the emission points before the lens and the lens focal length, generally resulting in a set of non-continuous, discrete angular positions. This configuration can be made to function as a discrete stepping laser scanner by causing the spatial apertures to emit in some pattern or sequence, for instance, thereby causing the output angle for the laser beam to vary through a pattern or sequence.

FIG. 5 shows the addition of mechanical scanning means to FIG. 4, so that truly continuous tuning may be achieved, including between the discrete angular positions shown in FIG. 4. However, if such mechanical scanning means are now included, then it can be argued that the discrete angular positions created by the spatial offsets before the lens are now largely unnecessary. The advantage enabled by FIG. 5 is the reduction in the total amount of angular scanning required of the mechanical scanning means, along with faster effective scanning speeds from simultaneous beams. Improved scanning is potentially achieved, but at the expense of inserting mechanically moving parts. Hence there is a need for a high-speed laser scanner with substantial output angular coverage, utilizing non-mechanical means, and enabling the use of multiple simultaneous scanning beams.

The present disclosure provides an optical system and a method for non-mechanically (i.e., without physical movement) scanning a laser using a lens, a steering optical element, and transmission and receive paths having a non-zero spatial offset.

The present disclosure also provides an optical system and a method for non-linearly and non-mechanically scanning a laser using a lens and a steering optical element, such that detection points resulting from the scanned laser are non-linearly mapped into space.

The present disclosure provides an optical system including an electromagnetic radiation source configured to output electromagnetic radiation having a particular wavelength in time based on received input parameters. The optical system also includes a transmit/receive optical element comprising a plurality of optical paths including: at least one transmit path configured to transmit the electromagnetic radiation emitted by the electromagnetic radiation source; and at least one receive path. Each of the at least one receive path is associated with a transmit path of the at least one transmit path, such that the electromagnetic radiation transmitted by a particular transmit path of the at least one transmit path that returns to the optical system is received by the associated receive path. Each of the at least one receive path is located separately from the associated transmit path, such that there is a non-zero spatial offset between each of the at least one receive path and the associated transmit path. The optical system also includes a lens having an optical axis. The lens is positioned such that the transmit/receive optical element is located at a focal plane of the lens. The lens is configured to: alter a trajectory of the transmitted electromagnetic radiation by an angular offset based on a spatial offset between the transmit path and the optical axis of the lens; and alter a trajectory of the received electromagnetic radiation by a spatial offset based on an angular offset between the optical axis of the lens and a path of the received electromagnetic radiation. The optical system also includes a steering optical element configured to receive the transmitted electromagnetic radiation altered by the lens and modify a trajectory of the altered transmitted electromagnetic radiation by an angle dependent upon a wavelength of the altered transmitted electromagnetic radiation without mechanically moving the steering optical element. The optical system further includes a controller configured to control a wavelength of electromagnetic radiation emitted by the electromagnetic radiation.

Alternatively or additionally, the steering optical element comprises an optically dispersive element.

Alternatively or additionally, the at least one transmit path comprises a plurality of transmit paths. The at least one receive path comprises a plurality of receive paths. The plurality of transmit paths are configured to simultaneously receive electromagnetic radiation from the electromagnetic radiation source, such that the electromagnetic radiation is transmitted simultaneously from the plurality of transmit paths.

Alternatively or additionally, each of the plurality of transmit paths is projected onto a detection point by the lens and the steering optical element. Emissions points of the plurality of transmit paths are non-uniformly spaced, such that the detection points associated with the plurality of transmit paths are non-uniformly spaced.

Alternatively or additionally, the detection points are non-uniformly spaced such that the detection points are more highly concentrated in particular areas. The higher concentration of the detection points in the particular areas results in a higher resolution imaging of the particular areas.

Alternatively or additionally, the optical system further includes a photosensor configured to detect the returning electromagnetic radiation received by the at least one receive path; and a controller configured to generate an image based on the detected returning electromagnetic radiation.

Alternatively or additionally, the optical system further comprises: a polarizing beam splitter positioned between the at least one transmit path and the lens, wherein the polarizing beam splitter is configured to transmit the electromagnetic radiation transmitted by the at least one transmit path; and a quarter wave plate positioned such that (1) the electromagnetic radiation transmitted by the lens interacts with the quarter wave plate and (2) the returning electromagnetic radiation interacts with the quarter wave plate before reaching the lens. The quarter wave plate is configured to alter a polarization of the transmitted electromagnetic radiation and the returning electromagnetic radiation, such that at least a portion of the returning electromagnetic radiation altered by the quarter wave plate has a different polarization from the transmitted electromagnetic radiation. The polarizing beam splitter is further configured to alter a trajectory of the returning electromagnetic radiation having a different polarization state than the transmitted electromagnetic radiation such that the returning electromagnetic radiation is received by the at least one receive path.

Alternatively or additionally, the at least one receive path comprises a plurality of receive paths including a first group of receive paths and a second group of receive paths. The polarizing beam splitter is further configured to: transmit the returning electromagnetic radiation having a same polarization state as the transmitted electromagnetic radiation, such that the returning electromagnetic radiation is received by the first group of receive paths; and alter a trajectory of the returning electromagnetic radiation having the different polarization state than the transmitted electromagnetic radiation, such that the returning electromagnetic radiation having the different polarization state than the transmitted electromagnetic radiation is received by the second group of receive paths.

Alternatively or additionally, the optical system does not include an optical circulator.

Alternatively or additionally, the transmit/receive optical element comprises a photonic integrated circuit.

Alternatively or additionally, the at least one transmit path comprises a plurality of transmit paths. The electromagnetic radiation comprises a laser and the electromagnetic radiation output by the laser is split into the plurality of transmit paths.

Alternatively or additionally, the at least one transmit path comprises a plurality of transmit paths. The electromagnetic radiation comprises multiple lasers and the electromagnetic radiation output by the multiple laser is split into the plurality of transmit paths.

Alternatively or additionally, the multiple lasers have a different central wavelength, such that the central wavelength of the electromagnetic radiation emitted by each of the multiple lasers is different.

Alternatively or additionally, the at least one transmit path comprises a plurality of transmit paths with nonlinear spacing between the plurality of transmit paths. The at least one receive path comprises a plurality of receive paths with nonlinear spacing between the plurality of receive paths. Emission points of the plurality of transmit paths are positioned to transmit electromagnetic radiation to the lens, such that the transmitted electromagnetic radiation received by the lens results in a coarse angular scan comprising nonlinear angular trajectories of electromagnetic radiation projected after the lens. The steering optical element is positioned to receive the coarse angular scan. The controller is configured to alter the wavelength of the emitted electromagnetic radiation, such that the steering optical element alters the nonlinear angular trajectories of the coarse angular scan by a fine angular separation. The fine angular separation is at least twice as small as the coarse angular separation.

Alternatively or additionally, the controller is configured to alter the wavelength of the emitted electromagnetic radiation in a pattern of linearly or non-linearly spaced steps to alter the nonlinear angular trajectories of the coarse angular scan by a fine angular separation, creating a set or pattern of altered nonlinear angular fine trajectories.

Alternatively or additionally, at least one set of altered nonlinear angular fine trajectories for one or more of the transmit paths in the coarse angular scan overlaps the set of altered nonlinear angular fine trajectories from another transmit path in the coarse angular scan. A combined angular scan pattern formed by the set of all altered nonlinear angular fine trajectories from all transmit paths varies spatially by a nonlinear pattern.

Alternatively or additionally, the controller is configured to alter the central wavelength of the range of wavelengths for the emitted electromagnetic radiation by an amount at least five times larger than the amount required for the fine angular separation. The resulting combined angular scan pattern formed by all the transmit Alternatively or additionally, each of the plurality of transmit paths is projected onto a detection point. The controller is configured to alter the wavelength of the emitted electromagnetic radiation across a range of wavelengths, such that the returning electromagnetic radiation from the detection points form pixels of a subpart of an image. The subpart comprises a row or a column.

Alternatively or additionally, the optical system further comprising a scanner configured to alter trajectories of the electromagnetic radiation transmitted by the steering optical element. The scanner is controlled by the controller such that the trajectories of the electromagnetic radiation transmitted by the steering optical element are altered such that multiple subparts are captured to form an image.

Alternatively or additionally, the scanner comprises a moving optical element.

Alternatively or additionally, the controller is configured to cause the pixels of a particular subpart to be imaged according to a pattern in time. The pattern in time is non-consecutive such that adjacent pixels are not imaged consecutively in time across the pattern.

Alternatively or additionally, the controller utilizes the pattern to spatially and spectrally encrypt the resulting imaging, such that any returning electromagnetic radiation not having a same pattern is discarded and is not used in the forming of the image.

Alternatively or additionally, the controller is further configured to capture multiple subparts to form the image by altering a starting wavelength of each of the multiple subparts, such that the trajectory of the electromagnetic radiation transmitted by the steering optical element is altered. The electromagnetic radiation source comprises a laser having a mode structure including multiple known modes. The starting wavelength of each of the multiple subparts occurs in a different known mode of the mode structure.

Alternatively or additionally, each of the plurality of transmit paths is projected onto a detection point. The controller is configured to alter the wavelength of the emitted electromagnetic radiation, such that the trajectory of the electromagnetic radiation transmitted by the steering optical element results in the detection points being non-uniformly spaced, such that the detection points are more highly concentrated in particular areas. The higher concentration of the detection points in the particular areas results in a higher resolution imaging of the particular areas.

Alternatively or additionally, the optical system further comprising a scanner configured to alter a trajectory of the electromagnetic radiation transmitted by the steering optical element. The scanner is controlled by the controller such that the trajectory of the electromagnetic radiation transmitted by the steering optical element is altered such that multiple subparts are captured to form the image.

The present disclosure further providing an optical system for receiving electromagnetic radiation from an electromagnetic radiation source. The optical system including a transmit optical element comprising a plurality of optical paths including at least one transmit path configured to transmit the electromagnetic radiation emitted by the electromagnetic radiation source. The optical system also including a lens having an optical axis. The lens is configured to alter a trajectory of the transmitted electromagnetic radiation by an angular offset based on a spatial offset between the transmit path and the optical axis of the lens. Emission points of the plurality of transmit paths are positioned to transmit electromagnetic radiation to the lens, such that the transmitted electromagnetic radiation received by the lens results in a coarse angular scan comprising nonlinear angular trajectories of electromagnetic radiation projected after the lens. The optical system also includes a steering optical element configured to: receive the transmitted electromagnetic radiation altered by the lens; and modify a trajectory of the altered transmitted electromagnetic radiation by an angle dependent upon an input signal without mechanically moving the steering optical element. The steering optical element is positioned to receive the coarse angular scan. The optical system additionally includes a controller configured to control the steering optical element in a pattern of linearly or non-linearly spaced steps to alter the nonlinear angular trajectories of the coarse scan by a fine angular separation, creating a set or pattern of altered nonlinear angular fine trajectories. The fine angular separation is at least twice as small as the coarse angular separation. At least one set of altered nonlinear angular fine trajectories for one or more of the transmit paths in the coarse angular scan overlaps the set of altered nonlinear angular fine trajectories from another transmit path in the coarse angular scan. A combined angular scan pattern formed by the set of all altered nonlinear angular fine trajectories from all transmit paths varies spatially by a nonlinear pattern.

The present disclosure additionally provides a method for altering electromagnetic radiation emitted by an electromagnetic radiation source using a transmit/receive optical aperture, a lens, a steering optical element, and a controller. The method comprising supplying input parameters to the electromagnetic radiation source via the controller to cause the electromagnetic radiation source to output electromagnetic radiation having a particular wavelength in time based on the supplied input parameters. The method further receives the outputted electromagnetic radiation with at least one transmit path of the transmit/receive optical element and transmitting from the at least one transmit path the electromagnetic radiation received from the electromagnetic radiation source. The method also uses the lens to alter a trajectory of the transmitted electromagnetic radiation by an angular offset based on a spatial offset between the transmit path and an optical axis of the lens. The method uses the steering optical element to receive the transmitted electromagnetic radiation altered by the lens and to modify a trajectory of the altered transmitted electromagnetic radiation by an angle dependent upon a wavelength of the altered transmitted electromagnetic radiation without mechanically moving the steering optical element. The method receives returning electromagnetic radiation with the steering optical element and directing the returning electromagnetic radiation to the lens. The method alters a trajectory of the returning electromagnetic radiation with the lens, such that: the returning electromagnetic radiation is received by at least one receive path of the transmit/receive optical aperture; and the electromagnetic radiation transmitted by a particular transmit path of the at least one transmit path that returns to the optical system is received by a receive path associated with the particular transmit path of the at least one transmit path. Each of the at least one receive path is located separately from the associated transmit path, such that there is a non-zero spatial offset between each of the at least one receive path and the associated transmit path.

Alternatively or additionally, the at least one transmit path comprises a plurality of transmit paths. The receiving of the outputted electromagnetic radiation with the plurality of transmit paths comprises simultaneously receiving with the plurality of transmit paths the received electromagnetic radiation. The transmitting of the outputted electromagnetic radiation with the plurality of transmit paths comprises simultaneously transmitting with the plurality of transmit paths the received electromagnetic radiation.

Alternatively or additionally, each of the plurality of transmit paths is projected onto a detection point by the lens and the steering optical element. Emissions points of the plurality of transmit paths are non-uniformly spaced, such that the detection points associated with the plurality of transmit paths are non-uniformly spaced.

Alternatively or additionally, the detection points are non-uniformly spaced such that the detection points are more highly concentrated in particular areas. The higher concentration of the detection points in the particular areas results in a higher resolution imaging of the particular areas.

Alternatively or additionally, the method further comprises generating an image based on the returning electromagnetic radiation detected using a photosensor received by the at least one receive path.

Alternatively or additionally, the method further comprises using a quarter wave plate to alter a polarization of the transmitted electromagnetic radiation and the returning electromagnetic radiation, such that at least a portion of the returning electromagnetic radiation altered by the quarter wave plate has a different polarization from the transmitted electromagnetic radiation; and using a polarizing beam splitter to alter a trajectory of the returning electromagnetic radiation having a different polarization state than the transmitted electromagnetic radiation such that the returning electromagnetic radiation is received by the at least one receive path.

Alternatively or additionally, the at least one receive path comprises a plurality of receive paths including a first group of receive paths and a second group of receive paths. The altering of the trajectory of the returning electromagnetic radiation comprises: transmitting the returning electromagnetic radiation having a same polarization state as the transmitted electromagnetic radiation, such that the returning electromagnetic radiation is received by the first group of receive paths; and altering a trajectory of the returning electromagnetic radiation having the different polarization state than the transmitted electromagnetic radiation, such that the returning electromagnetic radiation having the different polarization state than the transmitted electromagnetic radiation is received by the second group of receive paths.

Alternatively or additionally, the at least one transmit path comprises a plurality of transmit paths with nonlinear spacing between the plurality of transmit paths. The at least one receive path comprises a plurality of receive paths with nonlinear spacing between the plurality of receive paths. The transmitted electromagnetic radiation received by the lens results in a coarse angular scan comprising nonlinear angular trajectories of electromagnetic radiation projected after the lens. The method further comprises using the controller to alter the wavelength of the emitted electromagnetic radiation, such that the steering optical element modifies the nonlinear angular trajectories of the coarse angular scan by a fine angular separation. The fine angular separation is at least twice as small as the coarse angular separation.

Alternatively or additionally, using the controller to alter the wavelength of the emitted electromagnetic radiation comprises altering the wavelength of the emitted electromagnetic radiation in a pattern of linearly or non-linearly spaced steps to alter the nonlinear angular trajectories of the coarse angular scan by a fine angular separation, creating a set or pattern of altered nonlinear angular fine trajectories.

Alternatively or additionally, at least one set of altered nonlinear angular fine trajectories for one or more of the transmit paths in the coarse angular scan overlaps the set of altered nonlinear angular fine trajectories from another transmit path in the coarse angular scan. A combined angular scan pattern formed by the set of all altered nonlinear angular fine trajectories from all transmit paths varies spatially by a nonlinear pattern.

Alternatively or additionally, the controller is used to alter the central wavelength of the range of wavelengths for the emitted electromagnetic radiation by an amount at least five times larger than the amount required for the fine angular separation. The resulting combined angular scan pattern formed by all the transmit paths shifts in angle by an amount much larger than the fine angular separation.

Alternatively or additionally, each of the plurality of transmit paths is projected onto a detection point by the use of the steering optical element to modify the trajectory of the altered transmitted electromagnetic radiation. The method further comprising using the controller to alter the wavelength of the emitted electromagnetic radiation across a range of wavelengths, such that the returning electromagnetic radiation from the detection points form pixels of a subpart of an image. The subpart comprises a row or a column.

Alternatively or additionally, the method further comprises using a scanner to alter trajectories of the electromagnetic radiation transmitted by the steering optical element. The scanner is controlled such that the trajectories of the electromagnetic radiation transmitted by the steering optical element are altered such that multiple subparts are captured to form an image.

Alternatively or additionally, the method further comprises causing the pixels of a particular subpart to be imaged according to a pattern in time, wherein the pattern in time is non-consecutive such that adjacent pixels are not imaged consecutively in time across the pattern.

Alternatively or additionally, the method further comprises using the pattern to spatially and spectrally encrypt the resulting imaging, such that any returning electromagnetic radiation not having a same pattern is discarded and is not used in the forming of the image.

Alternatively or additionally, the electromagnetic radiation source comprises a laser having a mode structure including multiple known modes. The method further comprises: capturing multiple subparts to form the image by altering a starting wavelength of each of the multiple subparts, such that the trajectory of the electromagnetic radiation transmitted by the steering optical element is altered; and the starting wavelength of each of the multiple subparts occurs in a different known mode of the mode structure.

Alternatively or additionally, each of the plurality of transmit paths is projected onto a detection point by the lens and the steering optical element. The method further comprises using the controller to alter the wavelength of the emitted electromagnetic radiation, such that the trajectory of the electromagnetic radiation transmitted by the steering optical element results in the detection points being non-uniformly spaced, such that the detection points are more highly concentrated in particular areas; and the higher concentration of the detection points in the particular areas results in a higher resolution imaging of the particular areas.

Alternatively or additionally, the method further comprises using a scanner to alter a trajectory of the electromagnetic radiation transmitted by the steering optical element. The scanner is controlled such that the trajectory of the electromagnetic radiation transmitted by the steering optical element is altered such that multiple subparts are captured to form the image.

The present disclosure further provides a method for altering electromagnetic radiation emitted by an electromagnetic radiation source using a transmit/receive optical aperture, a lens, a steering optical element, and a controller. The method includes a transmit optical element comprising a plurality of optical paths including at least one transmit path configured to transmit the electromagnetic radiation emitted by the electromagnetic radiation source. The method transmits the electromagnetic radiation from the electromagnetic radiation source with at least one transmit path of the transmit/receive optical element. The method uses the lens to alter a trajectory of the transmitted electromagnetic radiation by an angular offset based on a spatial offset between the transmit path and an optical axis of the lens, such that emission points of the plurality of transmit paths are positioned to transmit electromagnetic radiation to the lens and the transmitted electromagnetic radiation received by the lens results in a coarse angular scan comprising nonlinear angular trajectories of electromagnetic radiation projected after the lens. The method uses the steering optical element to receive the transmitted electromagnetic radiation altered by the lens and to modify a trajectory of the altered transmitted electromagnetic radiation by an angle dependent upon an input signal without mechanically moving the steering optical element. Using the controller to control the steering optical element in a pattern of linearly or non-linearly spaced steps to alter the nonlinear angular trajectories of the coarse scan by a fine angular separation, creating a set or pattern of altered nonlinear angular fine trajectories. The fine angular separation is at least twice as small as the coarse angular separation. At least one set of altered nonlinear angular fine trajectories for one or more of the transmit paths in the coarse angular scan overlaps the set of altered nonlinear angular fine trajectories from another transmit path in the coarse angular scan. A combined angular scan pattern formed by the set of all altered nonlinear angular fine trajectories from all transmit paths varies spatially by a nonlinear pattern.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

FIG. 6A depicts an exemplary embodiment of the optical system.

FIG. 6B depicts an exemplary embodiment of the transmit/receive optical element including uniform spacing.

FIG. 6C depicts an exemplary embodiment of the transmit/receive optical element including non-uniform spacing.

FIG. 7 shows an exemplary embodiment of the optical system including a scanner.

FIG. 11 shows the generation of a single column of an image.

FIGS. 19 and 20 depict generation of a foveated image.

DETAILED DESCRIPTION

Figure 1:
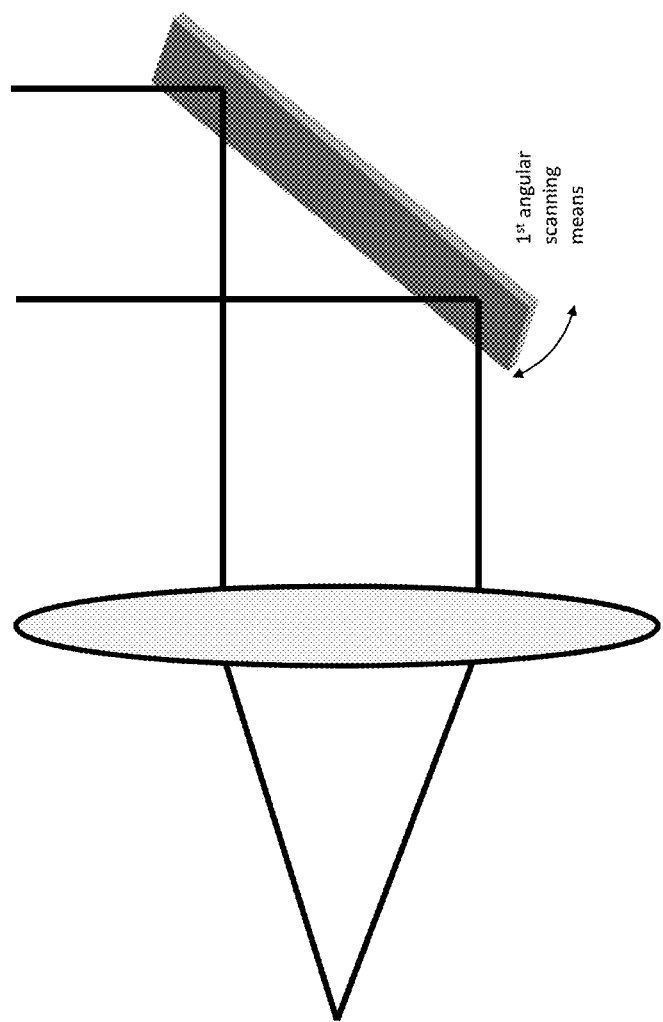
FIG. 1 is an exemplary embodiment of laser scanning known in the prior art having a first angular scanning means.
Figure 2:
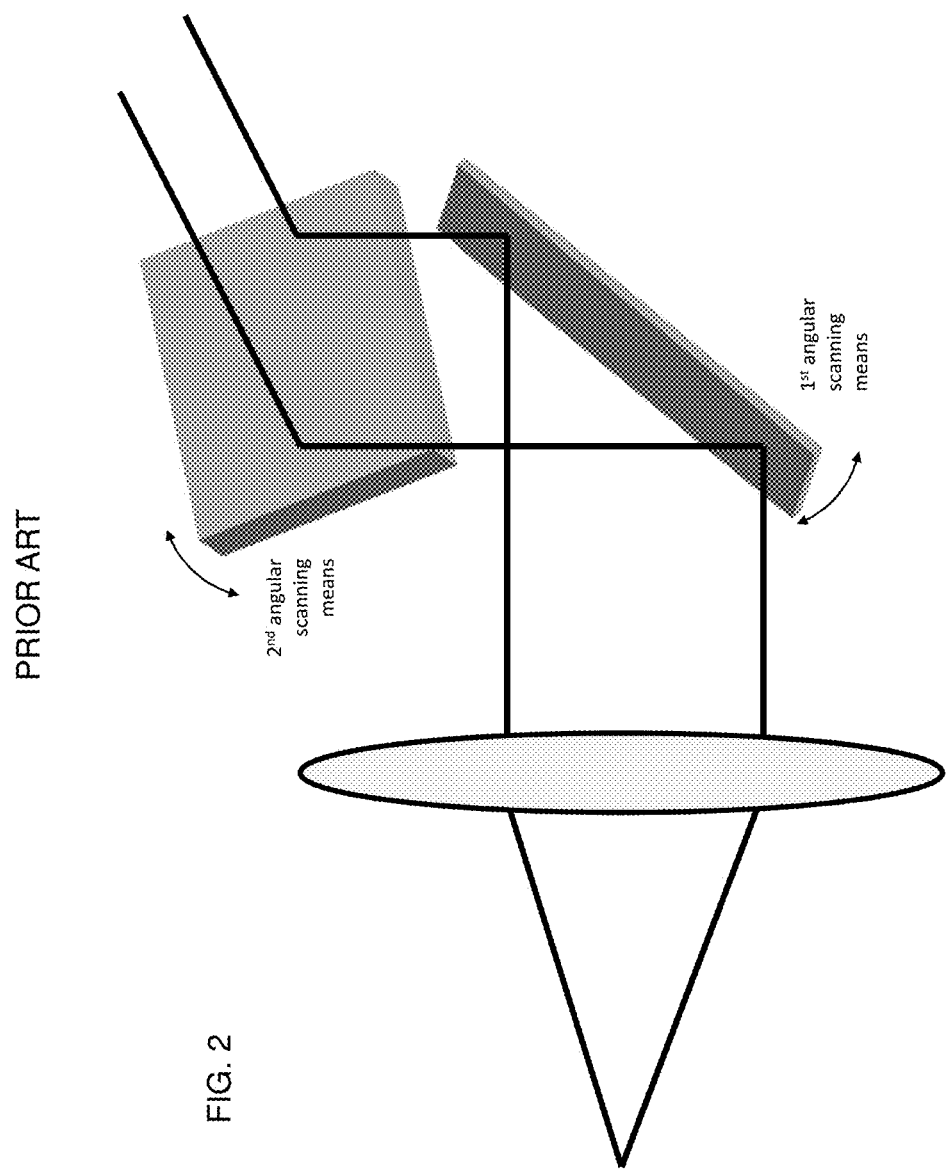
FIG. 2 is an exemplary embodiment of laser scanning known in the prior art having a first and second angular scanning means.
Figure 3:
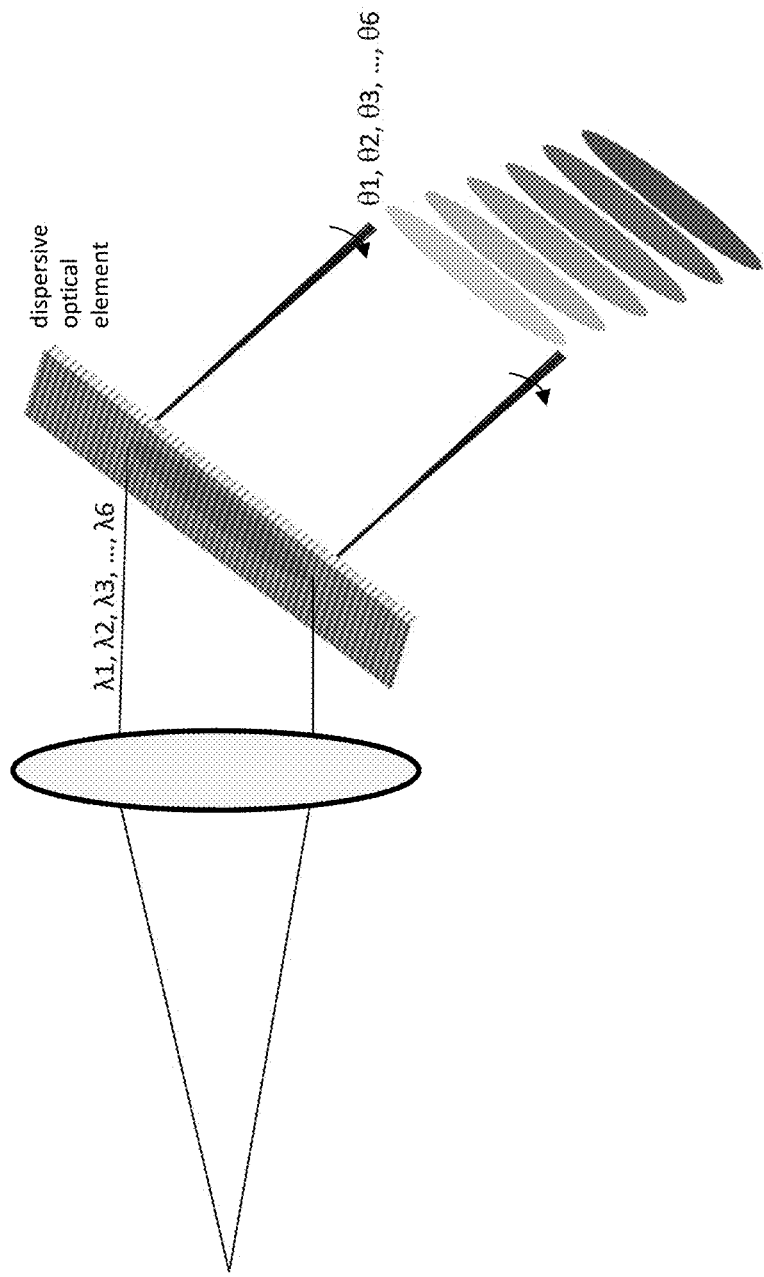
FIG. 3 is an exemplary embodiment of laser scanning known in the prior art using non-mechanical means.
Figure 4:
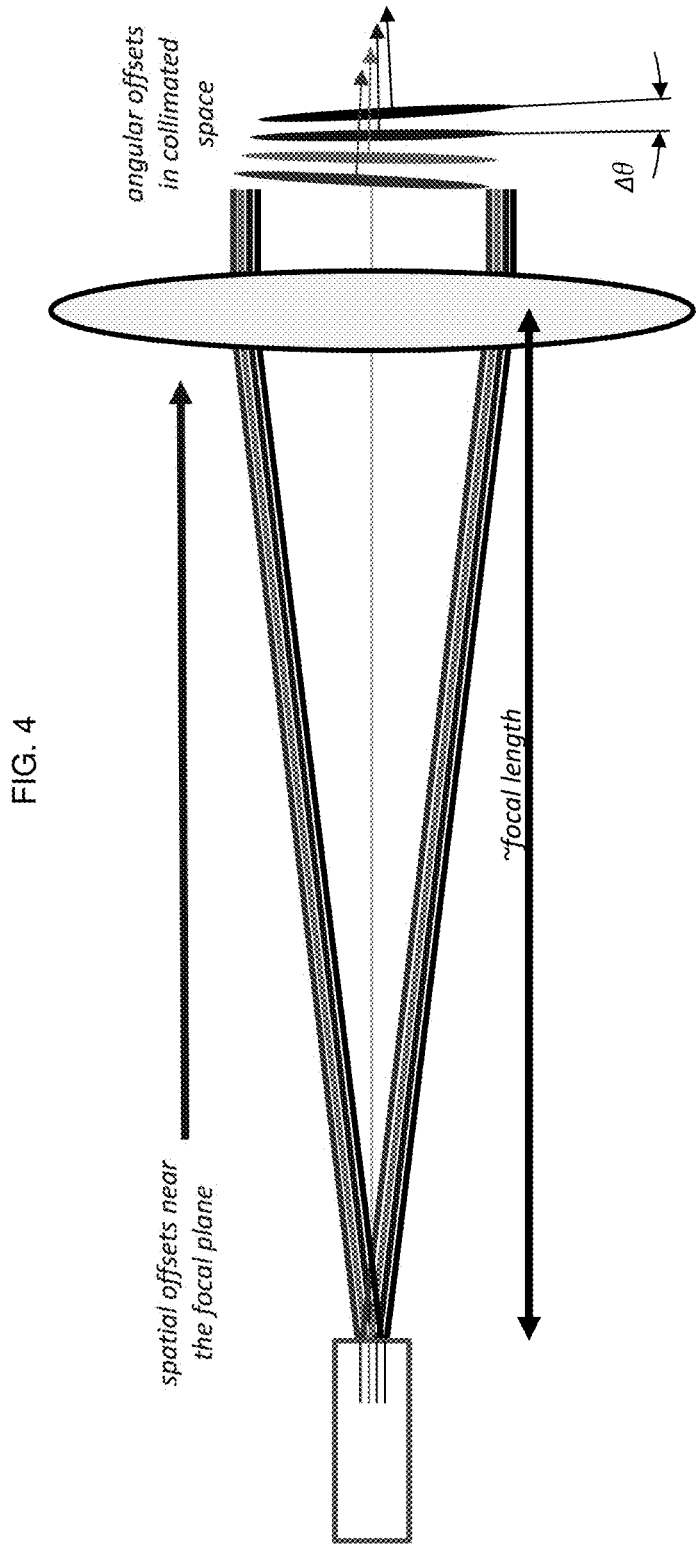
FIG. 4 is an exemplary embodiment of laser scanning using a lens.
Figure 5:
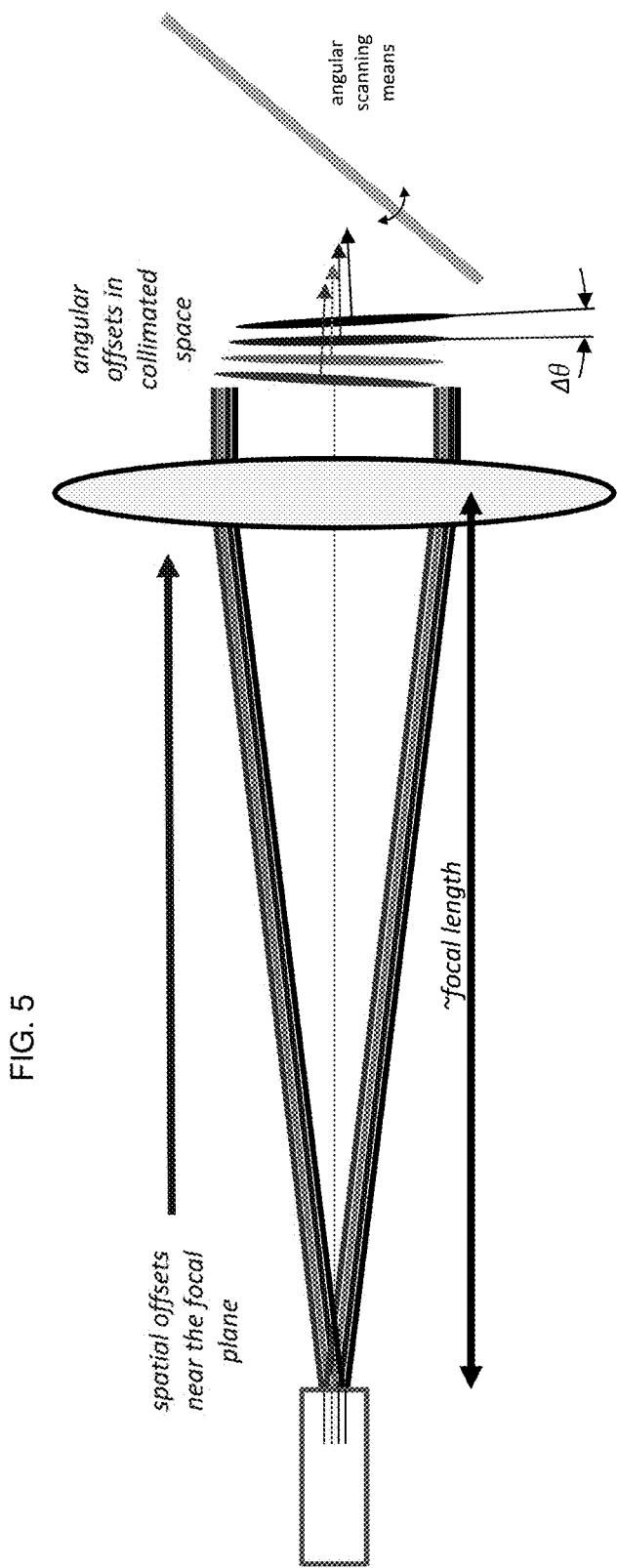
FIG. 5 is an exemplary embodiment of laser scanning using a lens and a mechanical scanning means.

The present invention is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It is desirous to implement a high-speed, non-mechanical laser scanning technique using multiple simultaneous beams arranged so that the laser scanning rate, as well as the active imaging rate, is much faster than the situation with a single scanning laser beam or multiple laser beams that are switched on and off sequentially. It is desirous to implement high-speed, non-mechanical laser scanning over a wide angular range via wavelength tuning, while relaxing the usual constraint for extremely wide laser tuning bandwidths. It is further desirous to have such a laser scanning and active imaging technique operate in either an optical polarization-dependent fashion or polarization-independent fashion. It is further desirous to implement such scanning and imaging in a way that is readily miniaturized and/or whose design is partially or wholly translatable to a Photonic Integrated Circuit (PIC). Finally, it is desirous for this scanning to function in such a way that encoding and encryption can be applied.

FIG. 6A shows an embodiment of an optical system 10 that satisfies the above requirements using an electromagnetic radiation source 12 (e.g., a high-speed tunable laser) in conjunction with a transmit/receive optical element 14, a lens 16, and an optically dispersive element 18 (also referred to as a steering optical element). The transmit/receive optical element 14 (also referred to as a spatial array of emission points) coupled with the lens 16 serves to provide a discrete set of output angles covering a wide angular range ("coarse scan") (e.g., a few degrees to tens of degrees). In general, the angles between the multiple beams are designed to reduce or eliminate crosstalk between adjacent beams, but this is not a strict requirement. This set of discrete output angles may be addressed in a simultaneous fashion using either an exemplary array of lasers for the emission points or an exemplary laser whose output is divided, or split, amongst the emission points. This array of angular output beams may be further directed towards an optically dispersive element 18, creating a further means for angular scanning via wavelength tuning of the laser(s). Importantly, true continuous laser scanning may now be achieved with a relatively small amount of wavelength tuning, requiring only tuning between adjacent discrete angular beam positions ("fine scan") rather than over the full angular extent of the beams.

For instance, if an exemplary configuration of FIG. 6A uses 32 emission points separated by 650 um, coupled to a 50 mm focal length lens, and incident upon a transmission grating with 0.08 nm/deg dispersion, then 23 degrees of laser scanning may be achieved using only 10 nm of laser wavelength tuning bandwidth. Using wavelength tuning alone with a single beam, a laser scan covering 23 degrees would normally require nearly 300 nm of laser tuning bandwidth. It is noted that often laser imaging is accomplished using high resolution but discretized (pixelized) laser scanning, and this scheme can accommodate this via fine discrete wavelength tuning rather than continuous wavelength tuning.

According to another aspect, variable spacing for the arrays of emitters may be used as shown in FIGS. 6B and 6C. FIG. 6B shows the respective central optical rays for a situation with 10 uniformly spaced emission points within the transmit/receive optical element 14, resulting in uniform (discrete) illumination for the laser scanning. FIG. 6C shows an exemplary situation where the spacing between emission points of the transmit/receive optical element 14 are non-uniform, here with a higher density of emission points in the middle of the array, thereby enabling higher spatial density of illumination for the central region of laser scanning. Generally, for active imaging, the detection points will incorporate a similar or identical spacing as the emission points.

The above preferred embodiment in FIGS. 6A-6C describes 1-D laser scanning when the optical dispersion is in nominally the same direction (plane) as the angular array of laser beams. It is possible to create 2-D laser scanning by making the plane of optical dispersion nominally perpendicular to the angular array of beams. However, this embodiment recreates the requirement for extremely wide laser tuning bandwidths in order to realize wide angular tuning in the perpendicular direction, while leaving the first dimension as a low-resolution discrete set of angles. Alternatively, numerous 2-D laser scanning embodiments can be realized using the preferred 1-D embodiment above and combining it in the orthogonal dimension with virtually any of the laser scanning means known in the art. FIG. 7 shows an example of this, using a scanner 22. The scanner 22 may comprise, e.g., either a traditional galvanometer mirror or a polygon mirror.

When laser scanning is combined with appropriate corresponding detection, the result is a laser-based image, or 'active imaging'. Certain active imaging applications strive to construct their elements in such a way so that the operation is 'polarization-insensitive', generally meaning that the system efficiency is only weakly dependent on optical polarization states. For other applications it is often desirable to account for the optical polarization of the laser beam(s) used, typically in both transmission and detection operations. The preferred embodiment described above is compatible with both these modalities.

Figure 8:
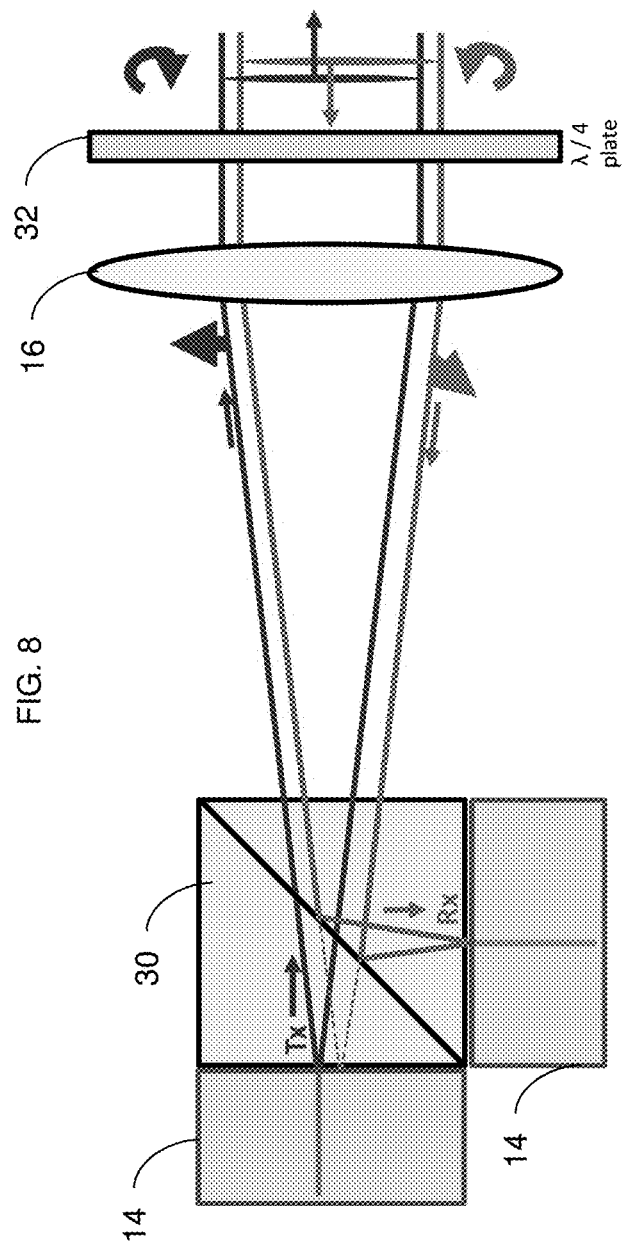
FIGS. 8 and 9 show exemplary embodiments of the optical system including a polarizing beam splitter and a quarter-wave plate.

An example is shown in FIG. 8, where the combined action of a polarizing beam splitter 30 and a quarter-wave plate 32 is used to separate and isolate the outgoing (Tx) beam from the incoming (Rx) beam via a classic polarization rotation configuration. Alternatively, replacing the polarizing beam splitter 30 with a non-polarizing beam splitter, and removing the quarter-wave plate, is an example of a polarization-insensitive approach. With regard to the present invention, the uniqueness here is that the Tx (Rx) locations shown may be 1D or 2D spatial arrays of emitters (detectors) positioned near the focal plane of a lens, as described above, enabling simultaneous multi-beam operation. In this example, the arrays extend into the dimension of the page, and each emission point in the Tx array has a corresponding detection point in the Rx array. Further, as shown in FIG. 8, there may be one or more spatial offsets between the array of Tx emission points and the one or more arrays of Rx detection points. Such spatial offsets may be used, for example, to compensate for detection efficiency reductions that arise during high speed laser scanning.

Figure 9:
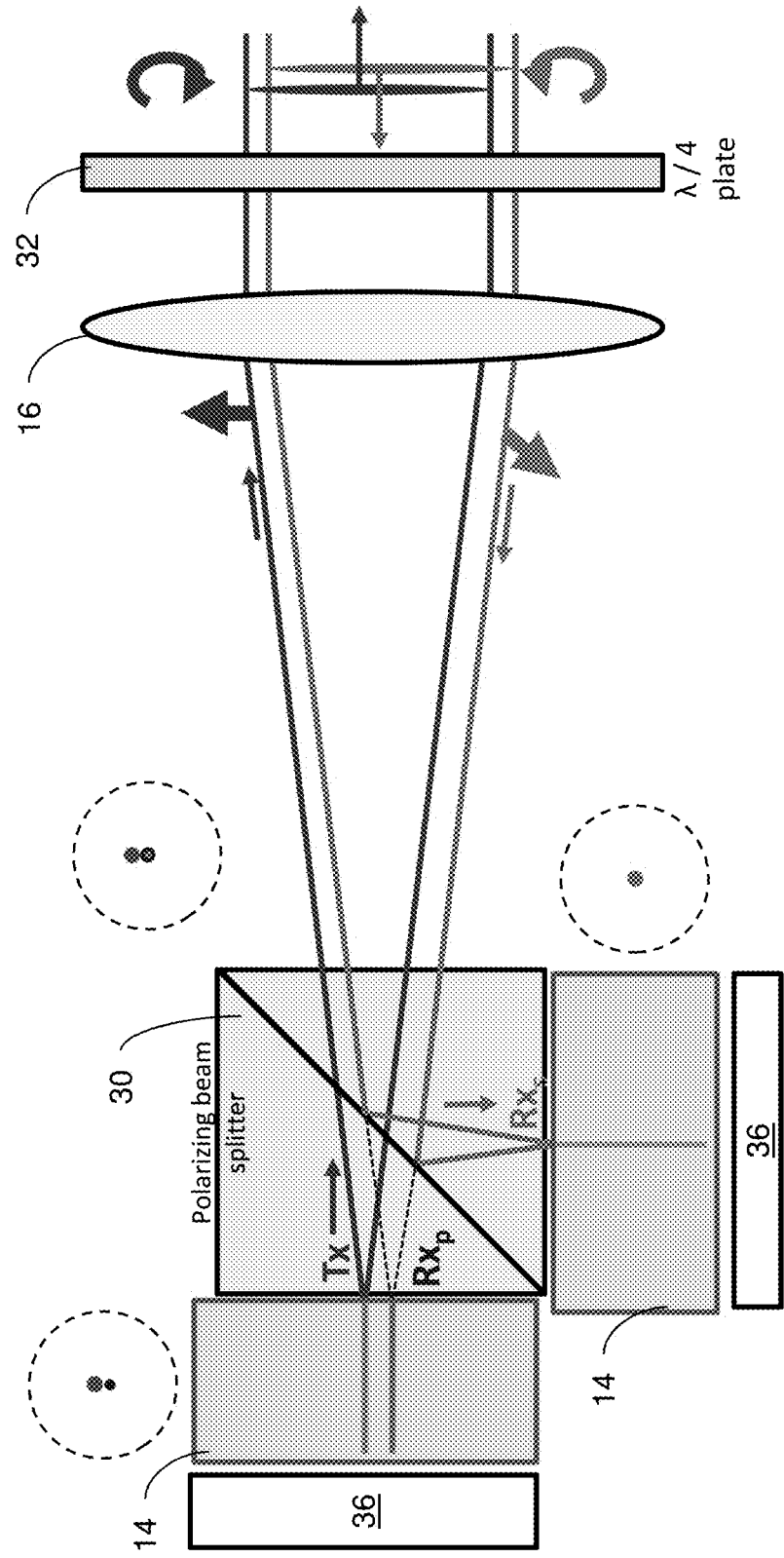
Figure 10:
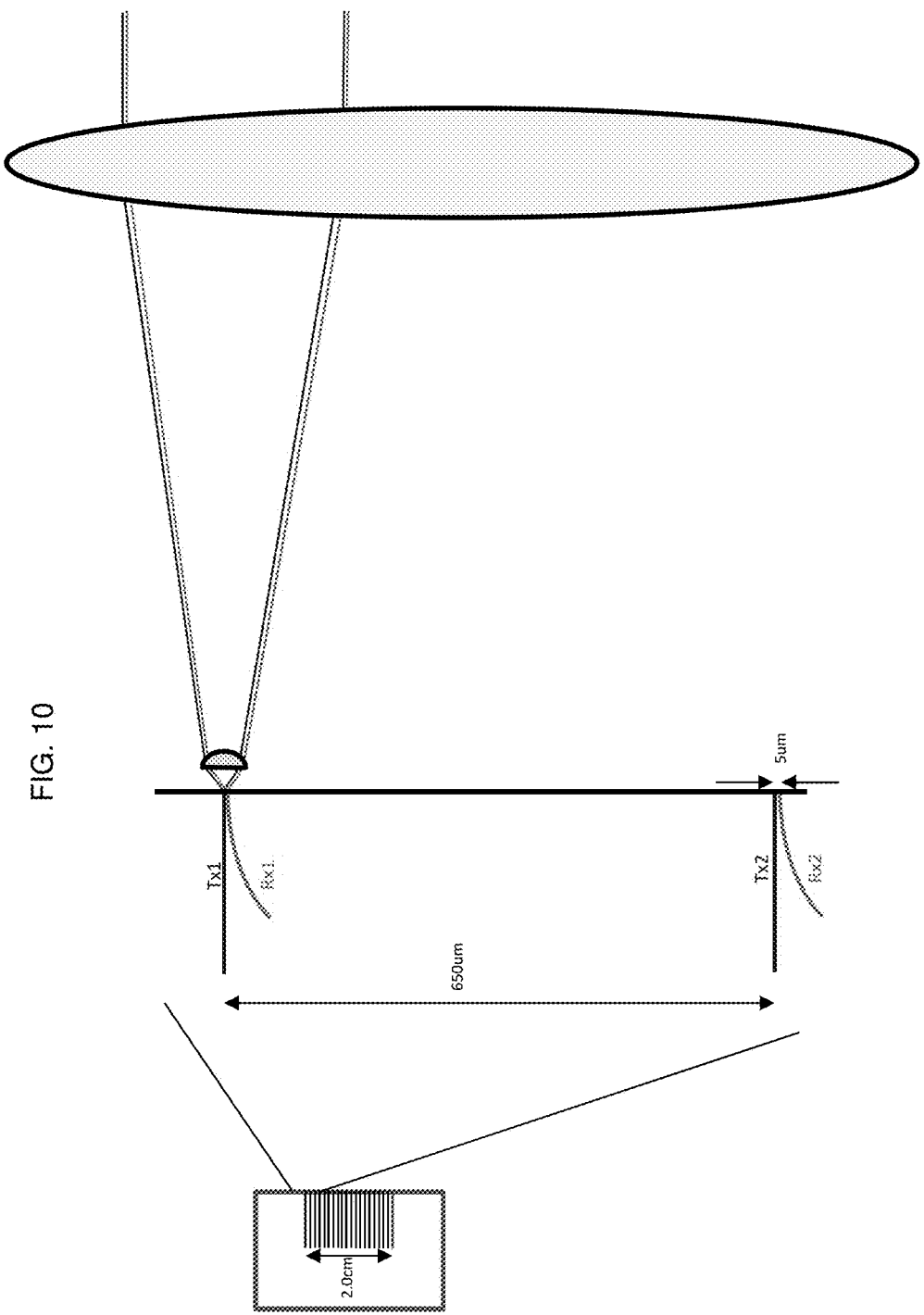
FIG. 10 shows an exemplary embodiment of an optical system having spatial offsets between transmission emission points and receiving points.

With appropriate design, as shown in FIG. 9, a true 'polarization diversity detection' scheme may be accommodated where detection of a single return polarization state represents only part of the return signal (i.e., other polarization states are not detected). FIG. 9 shows one very specific embodiment of polarization diversity detection incorporating a single spatial offset between the Tx and Rx emission points of the transmit/receive optical element 14. More generally, multiple spatial offsets may be incorporated in this way or the spatial offsets may be zero as in the conventionally-practiced approach. For any polarization diversity geometry, both polarization states may be detected using two detectors 36 and then summed in various fashions to create a total received signal. Finally, such spatial offsets between Tx and Rx may be incorporated specifically to improve the detection noise properties in applications such as coherent LiDAR—with or without high speed scanning—thereby eliminating all, or nearly all, undesirable optical reflections from the detection path as well as elimination of items such as optical circulators, as demonstrated in FIG. 10. In this case, a much smaller spatial offset (compared to the separation of Tx emission points) is used to physically separate a Tx point from its corresponding Rx point, here shown with an additional optional microlens before the primary lens.

Because optical circulators have not yet been developed for photonic circuits, traditional methods using a spatial offset approach (i.e., the transmission apertures and the receive apertures being the same) cannot be embodied as optical circuits. But, because the above described embodiments of the present disclosure have a non-zero spatial offset (i.e., the transmission aperture(s) being different from the receive aperture(s)), the above described embodiments may be embodied as photonic circuits.

There are a variety of ways that the spatial array of emission points 14 may be realized. Examples of optical technologies that may be used for the arrays of emission or detection points include, but are not limited to, arrays of single-mode fibers, arrays of polarization-maintaining fibers, single-mode multi-core fibers, polarization-maintaining multi-core fibers, arrays of multi-core fibers, and photonic integrated circuits.

Figure 11:
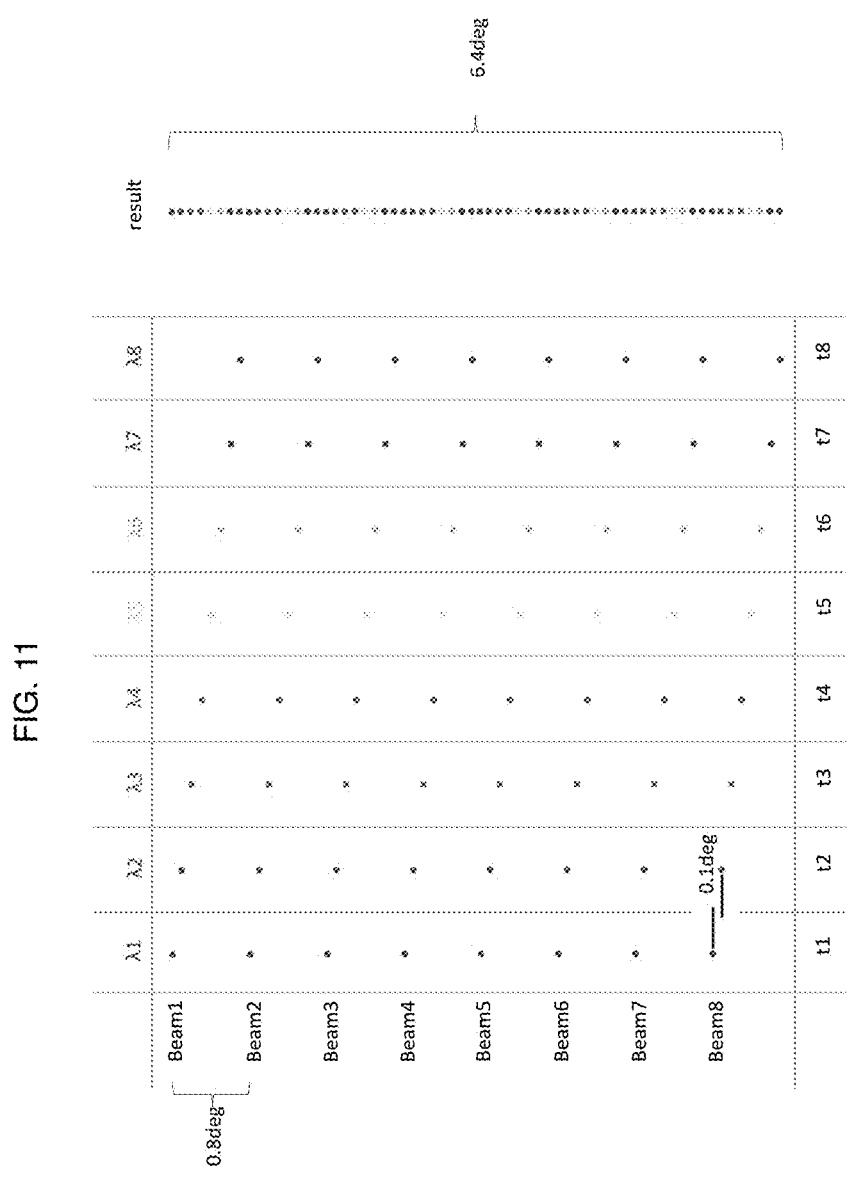

The present disclosure enables several novel regimes of operation for laser scanning resulting in image formation, all of which may or may not include encoding or encryption modalities. Several exemplary embodiments will be described here in order to highlight these features. FIG. 6A above shows an embodiment of the present invention using multiple simultaneous optical beams, and the following imaging embodiments use an 8-beam configuration by way of example. FIG. 11 shows the generation of a single column (alternatively, a single row) of an image using 8 beams, each separated by 0.8 degrees via designed spatial offsets near the focal plane of a lens, resulting in a total instantaneous angular separation of 7×0.8=5.6 degrees. In this example, the 8 beams are generated from a single laser whose power is divided into 8 portions. Alternatively, the 8 beams could be generated using one or more lasers (e.g., 8 individual lasers).

As an example, if the goal is to obtain higher resolution—pixels separated by 0.1 degrees, (rather than 0.8 degrees) then 7 intermediate pixels (beams) should be generated between each of the 8 nominal angular positions. This may be accomplished via wavelength tuning. In wavelength tuning, the 8 nominal beams each have a nominal wavelength of $\lambda 1$ and, when transmitted through the diffraction grating, are directed to their corresponding nominal beam angle. More generally, each instantaneous set of n simultaneous beams (or lasers) with m available wavelengths and with x available time slots may be characterized by a set of parameters at least comprising: (beam 1, time 1 . . . time x, $\lambda 1$ . . . $\lambda m$, $\theta 1$ . . . $\theta m$) . . . (beam n, time 1 . . . time x, $\lambda 1$ . . . $\lambda m$, $\theta 1$ . . . $\theta m$). If the laser is now tuned at time 2 to a new wavelength of $\lambda 2$, then the 8 beams move together to 8 new angles via the action of the exemplary diffraction grating. If $\lambda 2-\lambda 1=1.25$ nm and the grating dispersion is 0.08 degrees/nm then $\theta 2$ will be angularly shifted from $\theta 1$ by 0.1 degrees. This creates a new set of 8 simultaneous beams (pixels) as shown in the second column of FIG. 11. Repeating this process through 8 iterations (time 1 through time 8) results in an image column with the desired pixel resolution of 0.1 degrees rather than 0.8 degrees, with a resulting image spanning 6.4 degrees (initial 5.6 degrees plus 0.8 degrees). Advantageously, this process did NOT require the typical 6.4 degrees*(1 nm/0.08 degrees)=80 nm of laser tuning bandwidth to generate this angular range, but rather only required 8.75 nm. Further, this process of transitioning between pixels via wavelength tuning may be accomplished as fast as the laser can be tuned, and with an appropriate laser can be substantially faster than any mechanical angular tuning method. FIG. 6 shows this process somewhat diagrammatically, for two of the beams and 6 of the specified wavelength (angle) positions.

Figure 12:
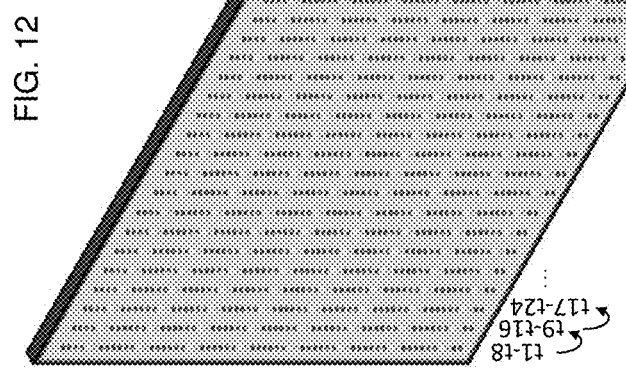
FIG. 12 depicts the generation of an image using the single columns of FIG. 11.

Continuing this example, and taking the simplest imaging modality, a scanner 22 (also referred to as a second scanning means) may be incorporated for moving the 8 beams in a direction orthogonal to the plane where the lens and dispersion are manipulating the angular positions. Assuming that such second scanning means has moved an appropriate amount (in this example 0.1 degrees resolution is desired), then the process above can be repeated for time 9 through time 16, creating a second column of the image, as shown in FIG. 12. This process is repeated until the entire image is created.

Figure 13A:
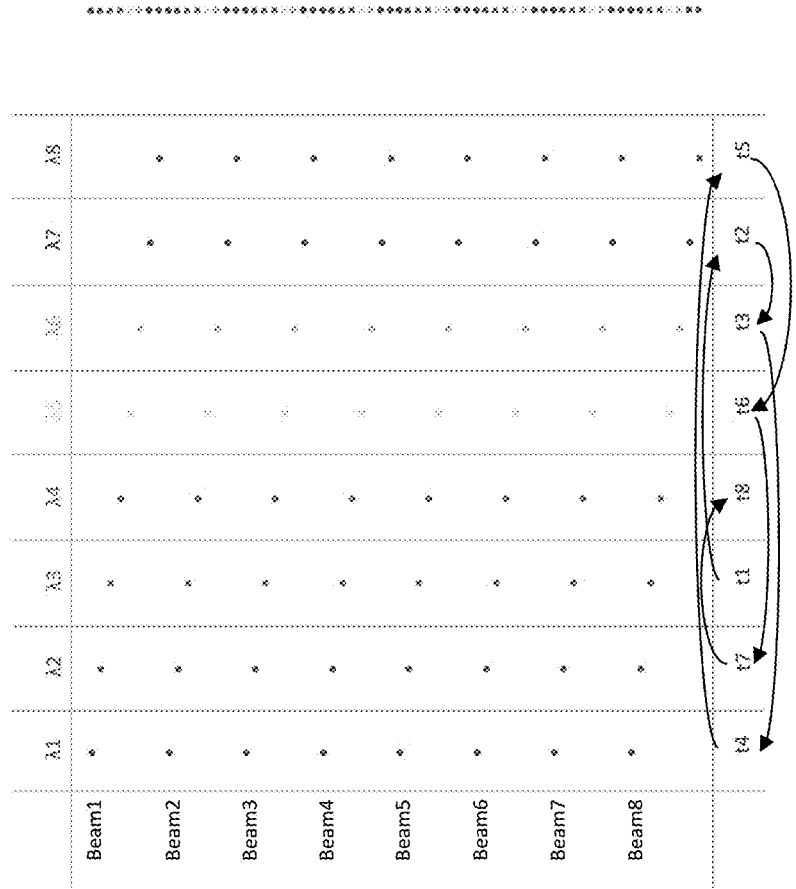
FIG. 13A depicts the relationship between wavelength and time in generating an image column.

Encryption (encoding) of an image generated by the optical system 10 may be accomplished in a simple and natural way when a scanner 22 is used. With an appropriate laser, the pattern of wavelength-tuned steps resulting in angle-tuned steps does not need to be operated in sequence. FIG. 13A shows such an example, where the same 8 wavelengths are chosen, but the time sequence of wavelengths is now $\lambda 3, \lambda 7, \lambda 6, \lambda 1, \lambda 8, \lambda 5, \lambda 2, \lambda 4$, rather than $\lambda 1, \lambda 2, \lambda 3, \lambda 4, \lambda 5, \lambda 6, \lambda 7, \lambda 8$. This variable pattern of wavelengths in time represents a modified form of 'frequency hopping' ('wavelength hopping') and can be used for encryption. Extensions of this example include, but are not limited to, unique encoding for each column of an image, and/or unique patterns (individual columns and/or entire images) of encoding for different sensors. Such techniques would be useful, for instance, to provide unique encoding and security for a LiDAR system in automobiles analogous to the unique code for a personal cell phone. Uniquely, this form of laser-scanned image encryption results in both wavelength (spectral) encryption and angular (spatial) encryption, providing enhanced security that makes the system even more difficult to hack, spoof, or disable. Security further increases when the number of beams or the number of wavelength steps increases. Advantageously, this image encoding technique can be implemented with essentially zero additional overhead or cost, with an appropriate high-speed tunable laser.

Figure 13B:
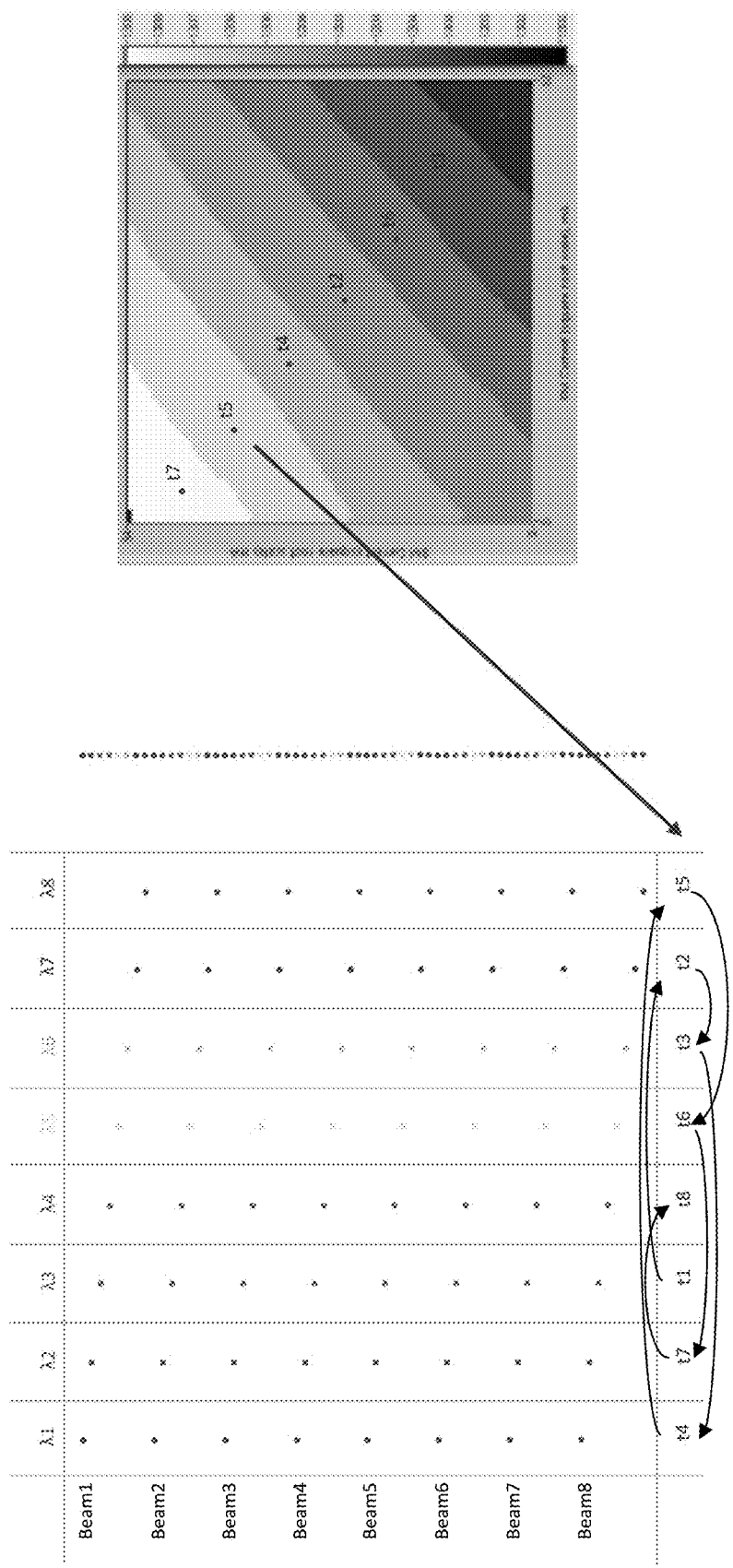
FIG. 13B depicts the relationship between wavelength, time, and laser mode in generating an image column.

An alternative embodiment of this invention, as both a system and method, may be implemented with a laser having a specifically-designed mode structure. Substantial steps in the wavelength for a laser may occur when the laser discontinuously moves from one laser mode to a different laser mode having a different wavelength. Such jumps or steps between modes are referred to as 'mode hops' by those skilled in the art and occur in lasers for a multitude of reasons. Typically, such mode hops are highly detrimental and undesirable, and great effort has been exerted to create lasers that tune through their full wavelength range without any mode hops. Such lasers are termed 'continuously tunable'. However, for the multi-beam wavelength-tuned laser scanning described herein, laser mode hops may be tailored specifically to implement the larger wavelength steps necessary to create the larger angular steps in scanning. Such a unique implementation eliminates the usually-strict requirement that the laser used be continuously tunable. FIG. 13B shows an example of the laser mode structure for a specific type of two-section tunable laser, where (in this case) tuning is achieved through two tuning currents (along the two axes of the plot). Each color band represents a different laser mode, and the discrete steps in color indicate this laser is not continuously tunable (in the configuration shown, there are wavelengths it cannot access). Since the laser scanning does not need to reach every possible angle, but rather it uses a finite, discrete set of angles (the pixels), it is therefore not necessary for the laser to access every possible wavelength within its range.

Extending the example of FIG. 13A, the laser mode plot in FIG. 13B shows seven time steps indicating seven different wavelengths for the laser, each in a different mode of the laser, and with an encoding pattern similar to FIG. 13A. As above, each different wavelength represents a different angle for the laser scan. While we note that this entire scheme is possible with a continuously tunable laser, there are specific advantages that can be realized via an implementation with a laser having a specific mode hop structure. Examples of lasers with mode hop structures compatible with this scheme include, but are not limited to: coupled cavity lasers, SGDBR lasers, multi-section discrete mode lasers, lasers with coupled ring reflectors, double ring resonator coupled lasers, V-cavity lasers, along with many others known to those skilled in the art. The laser mode hop spacing necessary for implementation within this laser scanning scheme typically fall in the range from 0.1 nm to 2 nm. Use of a laser having the described mode-hop structure is not limited to this explanation associated with FIGS. 13A and 13B, but rather is applicable to all embodiments and examples described herein.

Figure 14:
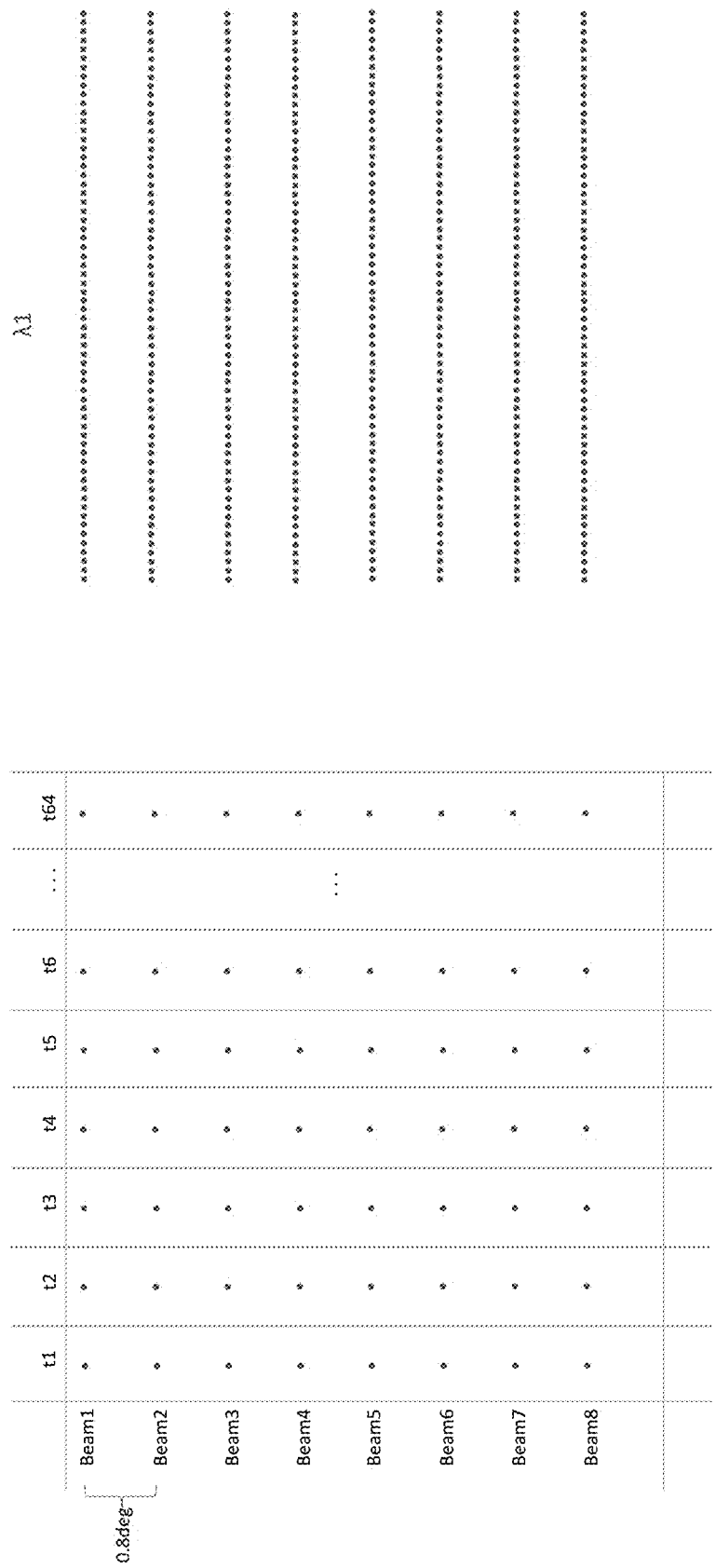
FIG. 14 depicts the generation of an image using a scanner.
Figure 15:
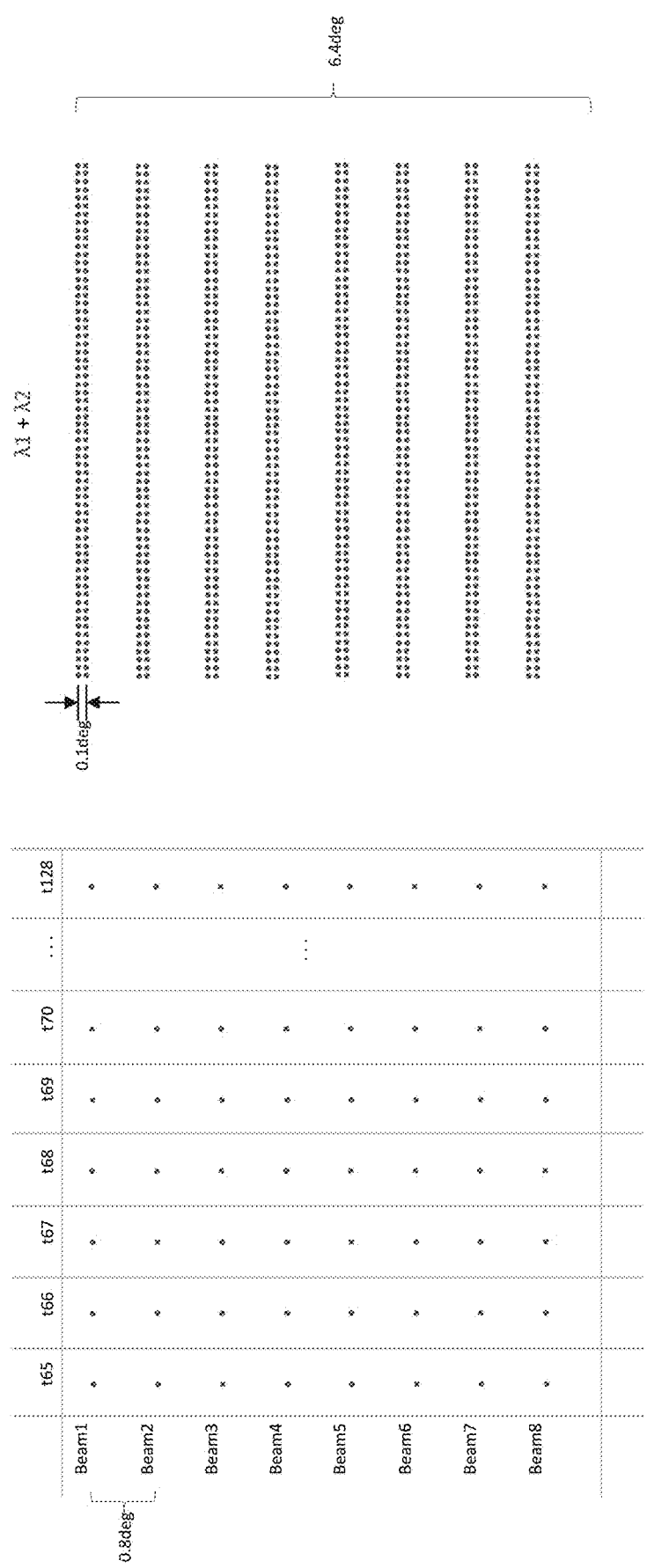
FIGS. 15 and 16 depicts the generation of an image in time using a scanner.
Figure 16:
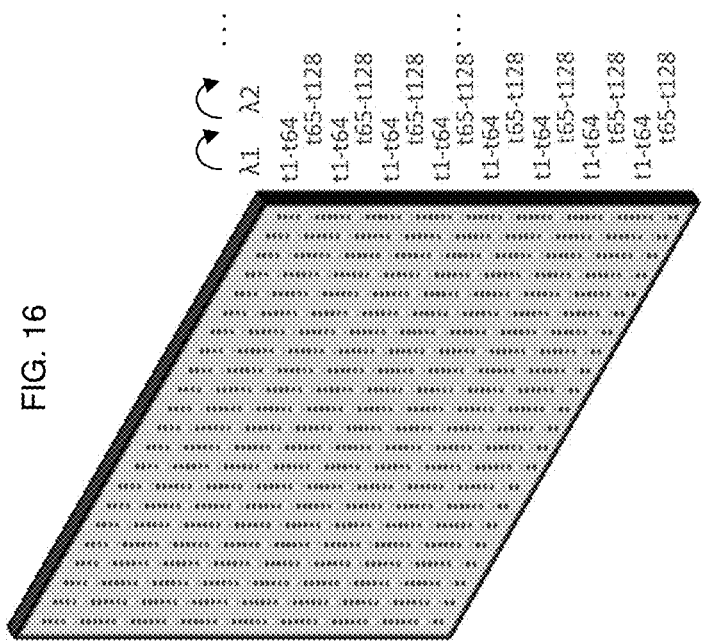

For another alternative embodiment of imaging using multi-beam, wavelength-tuned laser scanning, the time-sequenced pattern of the second scanning means 22 and the wavelength-tuned scanning may be modified or nearly reversed. FIG. 14 shows the same initial pattern (time 1) described above of 8 beams with nominal wavelength λ1. Now, rather than performing wavelength tuning at time 2, as above, the second scanning means moves angularly during time 2 through time 64 (assuming 64 pixels in that dimension) all with wavelength λ1. This results in 8 entire rows of an image being created (here spaced by 0.8 degrees again) using a single laser wavelength and a single set of 8 beams (FIG. 14). Now, at time t65, the laser wavelength is tuned to a new wavelength, λ2, and the process of generating 8 additional rows is repeated through time t128, as shown in FIG. 15. This process is repeated until the desired image is formed, as shown in FIG. 16.

Figure 17:
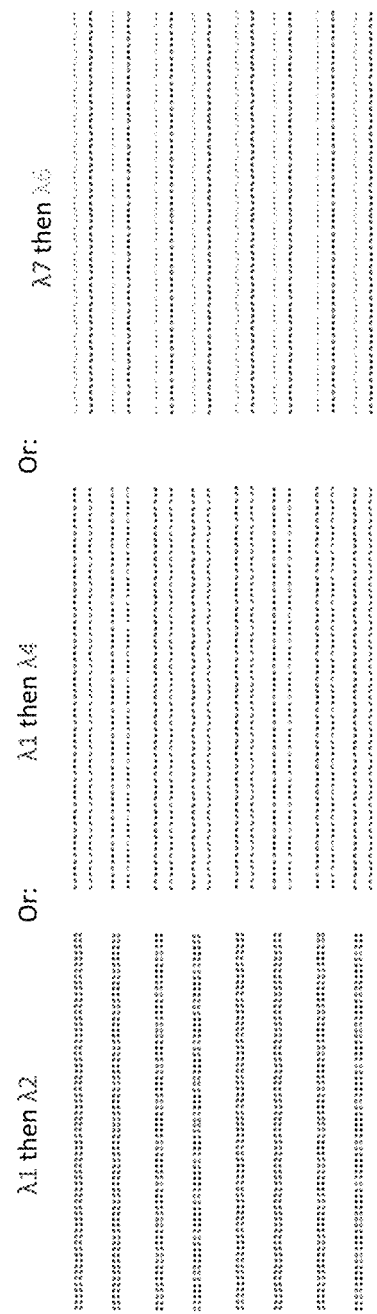
FIG. 17 depicts a choice between two sequential time sequenced wavelengths.

As with the above imaging example, encryption (encoding) may be implemented via a unique or random choice for the wavelength stepping (hopping) pattern in time. FIG. 17 describes elements of this process, where the encoding may occur by rows (rather than by columns or within a column, as above). FIG. 17 shows that the choice of two sequential time sequenced wavelengths could be λ1 then λ2, or it could be λ1 then λ4, or it could be λ7 then λ6. And this only illustrates the first two time-sequenced wavelengths, so it is clear that the overall random or arbitrary time sequence for all wavelengths represents another form of wavelength hopping (frequency hopping), as above. Again, the associated encoding represents a form of encryption that is both spectral and spatial. In this way, the specific pattern of rows within an image can have a unique time sequence due to the time sequence of wavelengths. The unique assignment of this pattern of rows represents a unique overall code for an image. For example, this unique image code can be assigned to each unique vehicle employing a machine vision system (e.g., LiDAR).

We note that, as with the spatial offsets for the optical paths shown before the lens in FIG. 6B and FIG. 6C and corresponding explanation, it is also possible to have non-uniform spacing of wavelength steps for the above imaging modalities. This can be used to further enhance resolution within portions of the image, or to create interlaced sequential images, or to provide real-time adjustments to the imaging field of view, as several potential examples.

Figure 18:
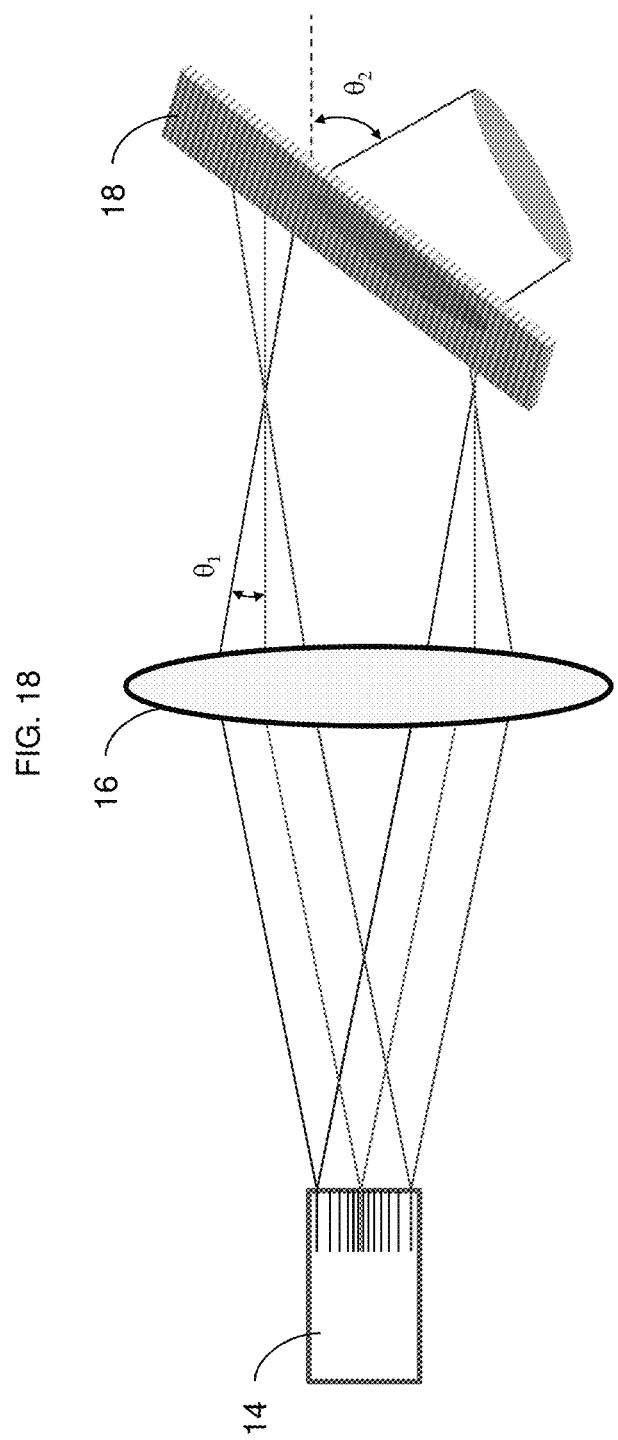
FIG. 18 shows a more detailed optical path view of the optical system of FIG. 6C.

As a specific example of an embodiment using a nonlinear pattern of spatially-offset optical paths, FIG. 18 shows a more detailed optical path view of the comparable situation shown in FIG. 6C. This configuration may be used to implement foveation using the simultaneous multi-beam, multi-wavelength scanning methods described herein. This technique relates to the aspect of a human eye (the fovea) that contains a higher density of rods and cones in the central region, resulting in the highest human resolution in that region. Other regions of the eye's field of view do not have the same high resolution. When an imaging system mimics this functionality, with a higher pixel density (higher resolution) in some region of an image, it is called foveation.

As in FIG. 6C, the nonlinear spatial pattern of optical paths in the focal plane results in a nonlinear pattern of angles after the lens (set of values for θ1, FIG. 18). The additional angular steering from the grating due to wavelength changes can be combined with the angular steering arising from the spatial offsets in the focal plane so that interleaving of angles (pixels) is the result. Advantageously, this interleaving of angles (pixels) may be programmatically accomplished so that the resulting pattern may be considered to be foveated.

This interleaving resulting in foveation is demonstrated in FIG. 19, which shows the spatial offsets in the focal plane along the x-axis, and the and the resulting (relative) output angles for all beams along the y-axis. It should be understood that this way of graphing makes it appear that the output pixels are offset in space, but this is merely a convenient visualization tool when analyzing the resulting interleaved pattern. In fact, the resulting pattern of output pixels occurs in a single aligned column in real space, as if all the spots for this graph were squeezed together into the y-axis. For FIG. 19, 8 nonuniformly spaced apertures are shown, along with a 20 nm laser tuning range with 20 uniform steps spaced 1 nm apart. Only 10 of the wavelengths are shown in the primary graph, for clarity, while all 20 wavelengths are shown for the zoomed-in graph. This results in a total of 8*20=160 pixels, with a 12 degree scanning range. The nonlinear spacing for the 8 paths (±250 um, ±750 um, ±2500 um, ±4500 um) combined with the 20 nm of wavelength tuning gives rise to a resulting angular space where angles (pixels) from two different beams can be repeated (identical final angles) or angles for one beam are positioned in between the angles for another beam (interleaved final angles).

FIG. 19 also shows a zoomed in version of this graph, showing that interleaving (with 3 beams) has been accomplished with this set of parameters, and the central 1 degree of the graph has 32 independent pixels resulting in a resolution of 0.03 degrees. Further, the next 0.5 degrees beyond this is also interleaved (with 2 beams) resulting in 0.04 degree resolution. Outside these angular ranges, the resolution defaults to that which is achieved using only a single beam. This foveated column (or row) resulting from these pixels can be further combined with scanning means in the second axis to provide a complete foveated image.

Figure 20:
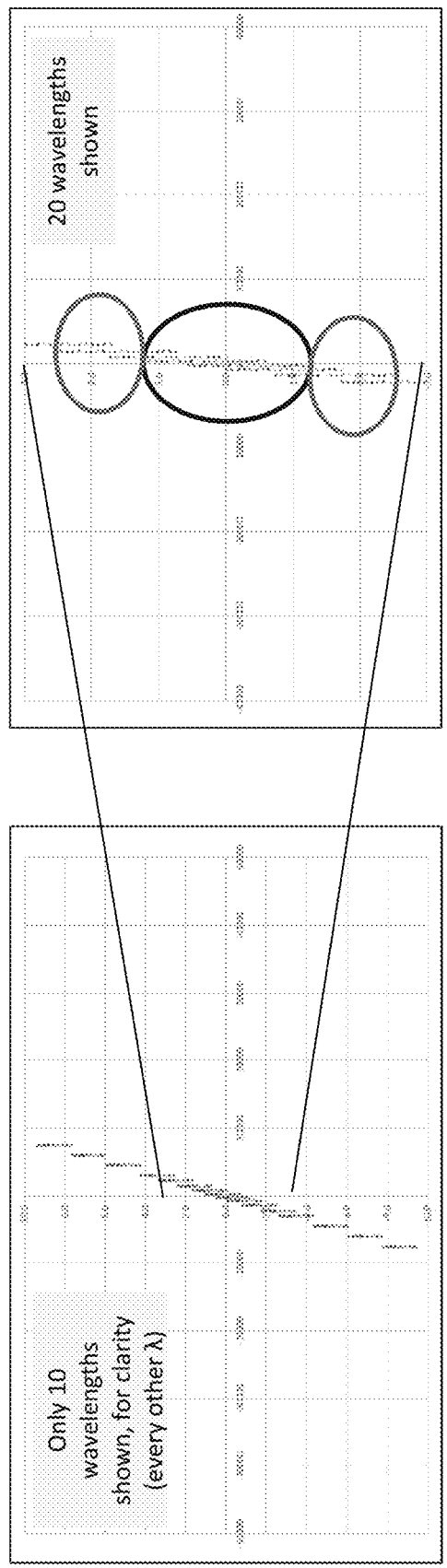

FIG. 19 shows an embodiment with 8 beams (8 paths) in the focal plane, and a scanning range of 12 degrees. For this example, the choice was made to have a larger total angular scan range, at the expense of a few gaps in the angular coverage where no pixels exist (from 1.8 deg to 2.0 deg, and again for 3.8 deg to 4.1 deg). While this choice is quite valid and may be preferred in some situations, with more beams (more paths) the situation improves in many respects. This is shown in FIG. 20, where 16 nonuniformly-spaced paths (beams) are used, again with 20 nm of total wavelength tuning, resulting in an 18 degree angular range with no gaps. Further, for the same uniform wavelength spacing of 1 nm, the central foveated region with 0.03 degree resolution increases to over 2 degrees, and the next foveated region outside that also doubles in size. This example achieves its performance again via the proper interleaving of 3 simultaneous beams, then 2 beams, as the angular range increases. Many more combinations of linear or nonlinearly spaced optical paths, combined with linear or nonlinearly spaced wavelength steps, are possible and provide means for flexible image patterns through this coupled parameter space.

Figure 21:
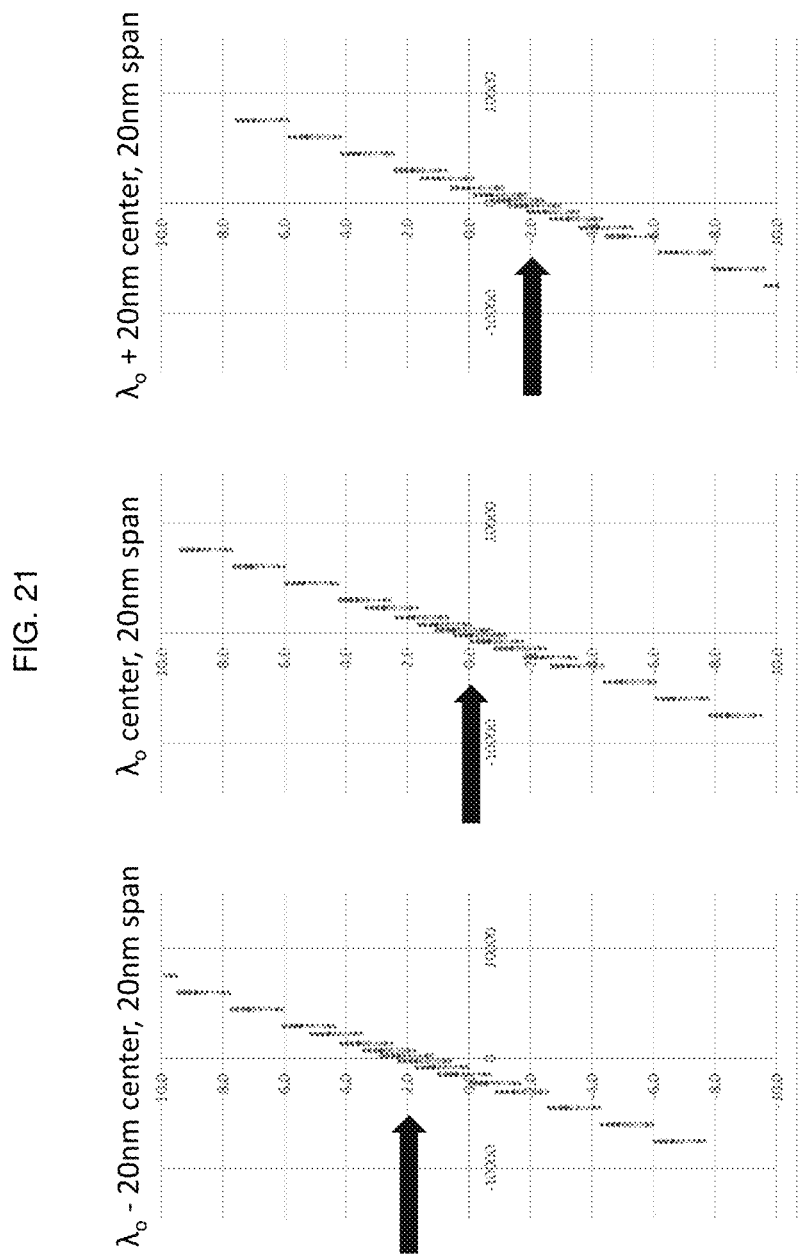
FIG. 21 depicts movement of the foveated region of an image.

As a final example of the flexibility of this novel scheme, FIG. 21 shows how the foveated region of FIG. 20 can be moved, in its entirety, by simply changing the central wavelength for the scheme by 20 nm while maintaining an overall 20 nm tuning span. This can be considered an example of 'adaptive foveation', that enables the central foveated region to be moved in a software-controlled way by simply re-tuning the laser or switching to another laser with a different central wavelength. With the use of several lasers having different central wavelengths, or a single laser with very wide bandwidth, some combination of lasers, or other means to vary the central wavelength in this way, the parameter space for flexible imaging grows even larger.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. An optical system comprising:
an electromagnetic radiation source configured to output electromagnetic radiation having at least one particular wavelength in time based on received input parameters;
a transmit/receive optical element comprising a plurality of optical paths including:
a plurality of transmit paths configured to transmit the electromagnetic radiation emitted by the electromagnetic radiation source, such that the transmitted electromagnetic radiation interacts with an external environment; and
a plurality of receive paths, wherein:
each of the plurality of receive paths is associated with a transmit path of the plurality of transmit paths, such that at least a portion of the electromagnetic radiation transmitted by a particular transmit path of the plurality of transmit paths that interacted with the external environment and returns to the optical system is received by the associated receive path; and
each of the plurality of receive paths is located separately from the associated transmit path, such that there is a non-zero spatial offset between each of the plurality of receive paths and the associated transmit path;
a lens having an optical axis, wherein:
the lens is positioned such that the transmit/receive optical element is located at a focal plane of the lens; and
the lens is configured to:
alter a trajectory of the transmitted electromagnetic radiation by an angular offset based on a spatial offset between the transmit path and the optical axis of the lens; and
alter a trajectory of the received electromagnetic radiation by a spatial offset based on an angular offset between the optical axis of the lens and a path of the received electromagnetic radiation;
a steering optical element configured to receive the transmitted electromagnetic radiation altered by the lens and modify a trajectory of the altered transmitted electromagnetic radiation by an angle dependent upon a wavelength of the altered transmitted electromagnetic radiation without mechanically moving the steering optical element; and
a controller configured to control a wavelength of electromagnetic radiation emitted by the electromagnetic radiation source.

2. The optical system of claim 1, wherein the steering optical element comprises an optically dispersive element.

3. The optical system of claim 1, wherein
the plurality of transmit paths are configured to simultaneously receive electromagnetic radiation from the electromagnetic radiation source, such that the electromagnetic radiation is transmitted simultaneously from the plurality of transmit paths.

4. The optical system of claim 3, wherein:
each of the plurality of transmit paths is projected onto a detection point by the lens and the steering optical element; and
emission points of the plurality of transmit paths are non-uniformly spaced, such that the detection points associated with the plurality of transmit paths are non-uniformly spaced.

5. The optical system of claim 4, wherein:
the detection points are non-uniformly spaced such that the detection points are more highly concentrated in particular areas; and
the higher concentration of the detection points in the particular areas results in a higher resolution imaging of the particular areas.

6. The optical system of claim 1, further comprising:
a photosensor configured to detect the returning electromagnetic radiation received by the plurality of receive paths; and
a controller configured to generate an image based on the detected returning electromagnetic radiation.

7. The optical system of claim 1, further comprising:
a polarizing beam splitter positioned between the plurality of transmit paths and the lens, wherein the polarizing beam splitter is configured to transmit the electromagnetic radiation transmitted by the plurality of transmit paths; and
a quarter wave plate positioned such that (1) the electromagnetic radiation transmitted by the lens interacts with the quarter wave plate and (2) the returning electromagnetic radiation interacts with the quarter wave plate before reaching the lens, wherein:
the quarter wave plate is configured to alter a polarization of the transmitted electromagnetic radiation and the returning electromagnetic radiation, such that at least a portion of the returning electromagnetic radiation altered by the quarter wave plate has a different polarization from the transmitted electromagnetic radiation;
the polarizing beam splitter is further configured to alter a trajectory of the returning electromagnetic radiation having a different polarization state than the transmitted electromagnetic radiation such that the returning electromagnetic radiation is received by the plurality of receive path.

8. The optical system of claim 7, wherein:
the plurality of receive paths comprises a plurality of receive paths including a first group of receive paths and a second group of receive paths;
the polarizing beam splitter is further configured to:
transmit the returning electromagnetic radiation having a same polarization state as the transmitted electromagnetic radiation, such that the returning electromagnetic radiation is received by the first group of receive paths; and
alter a trajectory of the returning electromagnetic radiation having the different polarization state than the transmitted electromagnetic radiation, such that the returning electromagnetic radiation having the different polarization state than the transmitted electromagnetic radiation is received by the second group of receive paths.

9. The optical system of claim 1, wherein the optical system does not include an optical circulator.

10. The optical system of claim 1, wherein the transmit/receive optical element comprises a photonic integrated circuit.

11. The optical system of claim 1, wherein:
the plurality of transmit paths comprises a plurality of transmit paths; and
the electromagnetic radiation comprises a laser and the electromagnetic radiation output by the laser is split into the plurality of transmit paths.

12. The optical system of claim 1, wherein:
the plurality of transmit paths comprises a plurality of transmit paths; and
the electromagnetic radiation comprises multiple lasers and the electromagnetic radiation output by the multiple laser is split into the plurality of transmit paths.

13. The optical system of claim 12, wherein the multiple lasers have a different central wavelength, such that the central wavelength of the electromagnetic radiation emitted by each of the multiple lasers is different.

14. The optical system of claim 1, wherein:
the plurality of transmit paths have nonlinear spacing between the plurality of transmit paths;
the plurality of receive paths have nonlinear spacing between the plurality of receive paths;
emission points of the plurality of transmit paths are positioned to transmit electromagnetic radiation to the lens, such that the transmitted electromagnetic radiation received by the lens results in a coarse angular scan comprising nonlinear angular trajectories of electromagnetic radiation projected after the lens;
the steering optical element is positioned to receive the coarse angular scan;
the controller is configured to alter the wavelength of the emitted electromagnetic radiation, such that the steering optical element alters the nonlinear angular trajectories of the coarse angular scan by a fine angular separation; and
the fine angular separation is at least twice as small as the coarse angular separation.

15. The optical system of claim 14, wherein;
the controller is configured to alter the wavelength of the emitted electromagnetic radiation in a pattern of linearly or non-linearly spaced steps to alter the nonlinear angular trajectories of the coarse angular scan by a fine angular separation, creating a set or pattern of altered nonlinear angular fine trajectories.

16. The optical system of claim 15, wherein;
at least one set of altered nonlinear angular fine trajectories for one or more of the transmit paths in the coarse angular scan overlaps the set of altered nonlinear angular fine trajectories from another transmit path in the coarse angular scan; and
a combined angular scan pattern formed by the set of all altered nonlinear angular fine trajectories from all transmit paths varies spatially by a nonlinear pattern.

17. The optical system of claim 14, wherein;
the controller is configured to alter the central wavelength of the range of wavelengths for the emitted electromagnetic radiation by an amount at least five times larger than the amount required for the fine angular separation; and
the resulting combined angular scan pattern formed by all the transmit paths shifts in angle by an amount much larger than the fine angular separation.

18. The optical system of claim 14, wherein:
each of the plurality of transmit paths is projected onto a detection point;
the controller is configured to alter the wavelength of the emitted electromagnetic radiation across a range of wavelengths, such that the returning electromagnetic radiation from the detection points form pixels of a subpart of an image; and
the subpart comprises a row or a column.

19. The optical system of claim 18, further comprising a scanner configured to alter trajectories of the electromagnetic radiation transmitted by the steering optical element, wherein:

the scanner is controlled by the controller such that the trajectories of the electromagnetic radiation transmitted by the steering optical element are altered such that multiple subparts are captured to form an image.

20. The optical system of claim 19, wherein the scanner comprises a moving optical element.

21. The optical system of claim 18, wherein:
the controller is configured to cause the pixels of a particular subpart to be imaged according to a pattern in time; and
the pattern in time is non-consecutive such that adjacent pixels are not imaged consecutively in time across the pattern.

22. The optical system of claim 21, wherein:
the controller utilizes the pattern to spatially and spectrally encrypt the resulting imaging, such that any returning electromagnetic radiation not having a same pattern is discarded and is not used in the forming of the image.

23. The optical system of claim 18, wherein:
each of the plurality of transmit paths is projected onto a detection point;
the controller is configured to alter the wavelength of the emitted electromagnetic radiation, such that the trajectory of the electromagnetic radiation transmitted by the steering optical element results in the detection points being non-uniformly spaced, such that the detection points are more highly concentrated in particular areas;
the higher concentration of the detection points in the particular areas results in a higher resolution imaging of the particular areas.

24. The optical system of claim 23, further comprising a scanner configured to alter a trajectory of the electromagnetic radiation transmitted by the steering optical element, wherein:
the scanner is controlled by the controller such that the trajectory of the electromagnetic radiation transmitted by the steering optical element is altered such that multiple subparts are captured to form the image.

25. The optical system of claim 14, wherein:
the controller is further configured to capture multiple subparts to form the image by altering a starting wavelength of each of the multiple subparts, such that the trajectory of the electromagnetic radiation transmitted by the steering optical element is altered;
the electromagnetic radiation source comprises a laser having a mode structure including multiple known modes; and
the starting wavelength of each of the multiple subparts occurs in a different known mode of the mode structure.

26. An optical system for receiving electromagnetic radiation from an electromagnetic radiation source, the optical system comprising:
a transmit optical element comprising a plurality of optical paths including a plurality of transmit paths configured to transmit the electromagnetic radiation emitted by the electromagnetic radiation source, such that the transmitted electromagnetic radiation interacts with external environment;
a lens having an optical axis, wherein:
the lens is configured to alter a trajectory of the transmitted electromagnetic radiation by an angular offset based on a spatial offset between the transmit path and the optical axis of the lens; and
emission points of the plurality of transmit paths are positioned to transmit electromagnetic radiation to the lens, such that the transmitted electromagnetic radiation received by the lens results in a coarse angular scan comprising nonlinear angular trajectories of electromagnetic radiation projected after the lens;
a steering optical element configured to:
receive the transmitted electromagnetic radiation altered by the lens; and
modify a trajectory of the altered transmitted electromagnetic radiation by an angle dependent upon an input signal without mechanically moving the steering optical element, wherein:
the steering optical element is positioned to receive the coarse angular scan;
a controller configured to control the steering optical element in a pattern of linearly or non-linearly spaced steps to alter the nonlinear angular trajectories of the coarse scan by a fine angular separation, creating a set or pattern of altered nonlinear angular fine trajectories, wherein:
the fine angular separation is at least twice as small as the coarse angular separation;
at least one set of altered nonlinear angular fine trajectories for one or more of the transmit paths in the coarse angular scan overlaps the set of altered nonlinear angular fine trajectories from another transmit path in the coarse angular scan; and
a combined angular scan pattern formed by the set of all altered nonlinear angular fine trajectories from all transmit paths varies spatially by a nonlinear pattern.

27. A method for altering electromagnetic radiation emitted by an electromagnetic radiation source using a transmit/receive optical aperture, a lens, a steering optical element, and a controller, the method comprising:
supplying input parameters to the electromagnetic radiation source via the controller to cause the electromagnetic radiation source to output electromagnetic radiation having a particular wavelength in time based on the supplied input parameters;
receiving the outputted electromagnetic radiation with a plurality of transmit paths of the transmit/receive optical element and transmitting from the plurality of transmit paths the electromagnetic radiation received from the electromagnetic radiation source, such that the transmitted electromagnetic radiation interacts with an external environment;
using the lens to alter a trajectory of the transmitted electromagnetic radiation by an angular offset based on a spatial offset between the transmit path and an optical axis of the lens;
using the steering optical element to receive the transmitted electromagnetic radiation altered by the lens and to modify a trajectory of the altered transmitted electromagnetic radiation by an angle dependent upon a wavelength of the altered transmitted electromagnetic radiation without mechanically moving the steering optical element;
receiving with the steering optical element returning electromagnetic a on that interacted with the external environment and directing the returning electromagnetic radiation to the lens; and
altering a trajectory of the returning electromagnetic radiation with the lens, such that:
the returning electromagnetic radiation is received by plurality of receive paths of the transmit/receive optical aperture; and
the electromagnetic radiation transmitted by a particular transmit path of the plurality of transmit paths that interacted with the external environment and returns to the optical system is received by a receive path associated with the particular transmit path of the plurality of transmit path;

wherein each of the plurality of receive paths is located separately from the associated transmit path, such that there is a non-zero spatial offset between each of the plurality of receive paths and the associated transmit path.

28. The method of claim 27, wherein:

the receiving of the outputted electromagnetic radiation with the plurality of transmit paths comprises simultaneously receiving with the plurality of transmit paths the received electromagnetic radiation; and the transmitting of the outputted electromagnetic radiation with the plurality of transmit paths comprises simultaneously transmitting with the plurality of transmit paths the received electromagnetic radiation.

29. The method of claim 28, wherein:

each of the plurality of transmit paths is projected onto a detection point by the lens and the steering optical element; and emissions points of the plurality of transmit paths are non-uniformly spaced, such that the detection points associated with the plurality of transmit paths are non-uniformly spaced.

30. The method of claim 29, wherein:

the detection points are non-uniformly spaced such that the detection points are more highly concentrated in particular areas; and the higher concentration of the detection points in the particular areas results in a higher resolution imaging of the particular areas.

31. The method of claim 27, further comprising:

generating an image based on the returning electromagnetic radiation detected using a photosensor received by the plurality of receive paths.

32. The method of claim 27, further comprising:

using a quarter wave plate to alter a polarization of the transmitted electromagnetic radiation and the returning electromagnetic radiation, such that at least a portion of the returning electromagnetic radiation altered by the quarter wave plate has a different polarization from the transmitted electromagnetic radiation;

using a polarizing beam splitter to alter a trajectory of the returning electromagnetic radiation having a different polarization state than the transmitted electromagnetic radiation such that the returning electromagnetic radiation is received by the plurality of receive paths.

33. The method of claim 32, wherein:

the plurality of receive paths comprises a plurality of receive paths including a first group of receive paths and a second group of receive paths;

the altering of the trajectory of the returning electromagnetic radiation comprises:

transmitting the returning electromagnetic radiation having a same polarization state as the transmitted electromagnetic radiation, such that the returning electromagnetic radiation is received by the first group of receive paths; and altering a trajectory of the returning electromagnetic radiation having the different polarization state than the transmitted electromagnetic radiation, such that the returning electromagnetic radiation having the different polarization state than the transmitted electromagnetic radiation is received by the second group of receive paths.

34. The method of claim 27, wherein:

the plurality of transmit paths have nonlinear spacing between the plurality of transmit paths;

the plurality of receive paths have nonlinear spacing between the plurality of receive paths;

the transmitted electromagnetic radiation received by the lens results in a coarse angular scan comprising nonlinear angular trajectories of electromagnetic radiation projected after the lens;

the method further comprises using the controller to alter the wavelength of the emitted electromagnetic radiation, such that the steering optical element modifies the nonlinear angular trajectories of the coarse angular scan by a fine angular separation; and the fine angular separation is at least twice as small as the coarse angular separation.

35. The method of claim 34, wherein;

using the controller to alter the wavelength of the emitted electromagnetic radiation comprises altering the wavelength of the emitted electromagnetic radiation in a pattern of linearly or non-linearly spaced steps to alter the nonlinear angular trajectories of the coarse angular scan by a fine angular separation, creating a set or pattern of altered nonlinear angular fine trajectories.

36. The method of claim 35, wherein;

at least one set of altered nonlinear angular fine trajectories for one or more of the transmit paths in the coarse angular scan overlaps the set of altered nonlinear angular fine trajectories from another transmit path in the coarse angular scan; and a combined angular scan pattern formed by the set of all altered nonlinear angular fine trajectories from all transmit paths varies spatially by a nonlinear pattern.

37. The method of claim 34, wherein;

the controller is used to alter the central wavelength of the range of wavelengths for the emitted electromagnetic radiation by an amount at least five times larger than the amount required for the fine angular separation; and the resulting combined angular scan pattern formed by all the transmit paths shifts in angle by an amount much larger than the fine angular separation.

38. The method of claim 34, wherein:

each of the plurality of transmit paths is projected onto a detection point by the use of the steering optical element to modify the trajectory of the altered transmitted electromagnetic radiation;

the method further comprising using the controller to alter the wavelength of the emitted electromagnetic radiation across a range of wavelengths, such that the returning electromagnetic radiation from the detection points form pixels of a subpart of an image; and the subpart comprises a row or a column.

39. The method of claim 38, further comprising using a scanner to alter trajectories of the electromagnetic radiation transmitted by the steering optical element, wherein:

the scanner is controlled such that the trajectories of the electromagnetic radiation transmitted by the steering optical element are altered such that multiple subparts are captured to form an image.

40. The method of claim 38, further comprising:

causing the pixels of a particular subpart to be imaged according to a pattern in time, wherein the pattern in time is non-consecutive such that adjacent pixels are not imaged consecutively in time across the pattern.

41. The method of claim 40, further comprising:

using the pattern to spatially and spectrally encrypt the resulting imaging, such that any returning electromagnetic radiation not having a same pattern is discarded and is not used in the forming of the image.

42. The method of claim 38, wherein:

each of the plurality of transmit paths is projected onto a detection point by the lens and the steering optical element;

the method further comprises using the controller to alter the wavelength of the emitted electromagnetic radiation, such that the trajectory of the electromagnetic radiation transmitted by the steering optical element results in the detection points being non-uniformly spaced, such that the detection points are more highly concentrated in particular areas; and the higher concentration of the detection points in the particular areas results in a higher resolution imaging of the particular areas.

43. The method of claim 42, further comprising using a scanner to alter a trajectory of the electromagnetic radiation transmitted by the steering optical element, wherein:

the scanner is controlled such that the trajectory of the electromagnetic radiation transmitted by the steering optical element is altered such that multiple subparts are captured to form the image.

44. The method of claim 34, wherein the electromagnetic radiation source comprises a laser having a mode structure including multiple known modes, the method further comprising:

capturing multiple subparts to form the image by altering a starting wavelength of each of the multiple subparts, such that the trajectory of the electromagnetic radiation transmitted by the steering optical element is altered; and the starting wavelength of each of the multiple subparts occurs in a different known mode of the mode structure.

45. A method for altering electromagnetic radiation emitted by an electromagnetic radiation source using a transmit/receive optical aperture, a lens, a steering optical element, and a controller, the method comprising:

a transmit optical element comprising a plurality of optical paths including a plurality of transmit paths configured to transmit the electromagnetic radiation emitted by the electromagnetic radiation source, such that the transmitted electromagnetic radiation interacts with an external environment;

transmitting the electromagnetic radiation from the electromagnetic radiation source with a plurality of transmit paths of the transmit/receive optical element;

using the lens to alter a trajectory of the transmitted electromagnetic radiation by an angular offset based on a spatial offset between the transmit path and an optical axis of the lens, such that emission points of the plurality of transmit paths are positioned to transmit electromagnetic radiation to the lens and the transmitted electromagnetic radiation received by the lens results in a coarse angular scan comprising nonlinear angular trajectories of electromagnetic radiation projected after the lens; and using the steering optical element to receive the transmitted electromagnetic radiation altered by the lens and to modify a trajectory of the altered transmitted electromagnetic radiation by an angle dependent upon an input signal without mechanically moving the steering optical element;

using the controller to control the steering optical element in a pattern of linearly or non-linearly spaced steps to alter the nonlinear angular trajectories of the coarse scan by a fine angular separation, creating a set or pattern of altered nonlinear angular fine trajectories, wherein:

the fine angular separation is at least twice as small as the coarse angular separation;

at least one set of altered nonlinear angular fine trajectories for one or more of the transmit paths in the coarse angular scan overlaps the set of altered nonlinear angular fine trajectories from another transmit path in the coarse angular scan; and a combined angular scan pattern formed by the set of all altered nonlinear angular fine trajectories from all transmit paths varies spatially by a nonlinear pattern.

* * * * *